US012475365B2

(12) United States Patent
Lloyd et al.

(10) Patent No.: US 12,475,365 B2
(45) Date of Patent: Nov. 18, 2025

(54) EMBEDDED MULTI-ATTRIBUTE MACHINE LEARNING FOR STORAGE DEVICES

(71) Applicant: Western Digital Technologies, Inc., San Jose, CA (US)

(72) Inventors: Jonathan Lloyd, Newport Beach, CA (US); Anand Gupta, Bengaluru (IN); Stella Achtenberg, Netanya (IL); Ofir Pele, Hod HaSharon (IL); Chun Sei Tsai, Tustin, CA (US); Amit Chattopadhyay, San Jose, CA (US); Aimamorn Suvichakorn, Nonthaburi (TH); Krzysztof Gladysz, Katowice (PL); Kameron Jung, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 531 days.

(21) Appl. No.: 17/180,057

(22) Filed: Feb. 19, 2021

(65) Prior Publication Data
US 2022/0121930 A1    Apr. 21, 2022

Related U.S. Application Data

(60) Provisional application No. 63/094,067, filed on Oct. 20, 2020.

(51) Int. Cl.
*G06N 3/08* (2023.01)
*G06N 3/04* (2023.01)
*G06N 3/10* (2006.01)

(52) U.S. Cl.
CPC ............... *G06N 3/08* (2013.01); *G06N 3/04* (2013.01); *G06N 3/10* (2013.01)

(58) Field of Classification Search
CPC ... G06N 3/08; G06N 3/04; G06N 3/10; G06F 3/0608; G06F 3/0643; G06F 3/0671
See application file for complete search history.

(56) References Cited

U.S. PATENT DOCUMENTS

| | | |
|---|---|---|
| 6,725,098 B2 | 4/2004 | Edwards et al. |
| 7,707,461 B2 | 4/2010 | Dougherty et al. |
| 7,930,507 B2 | 4/2011 | Perry et al. |
| 8,489,525 B2 | 7/2013 | Bisdikian et al. |

(Continued)

*Primary Examiner* — Li B. Zhen
*Assistant Examiner* — Henry Nguyen

(57) ABSTRACT

Methods are provided for tactically deploying machine learning operations within existing storage devices without the need for additional capital investment. Machine learning operations are specifically designed to locate and evaluate multiple types of data to complete an operation, including synthesizing missing data. These operations may be processed within a SoC of a storage device as embedded software. Storage devices designed to utilize machine learning methods within existing configurations can include a non-volatile memory for storing data, executable instructions, and a processor to conduct a variety of steps. The steps can include executing a plurality of applications stored in the non-volatile memory, and receiving a request for data, including measurements, from at least one of the applications. The steps can further determine if the requested data is suitable for substitution by an inference and subsequently select at least one machine learning model for generating a suitable inference.

20 Claims, 10 Drawing Sheets

(56) References Cited

U.S. PATENT DOCUMENTS

| | | |
|---|---|---|
| 9,305,595 B2 | 4/2016 | Hwang et al. |
| 10,108,791 B1* | 10/2018 | Masterman ............ G06F 21/316 |
| 10,176,829 B1 | 1/2019 | Li |
| 10,310,821 B2 | 6/2019 | Brown et al. |
| 10,339,448 B2 | 7/2019 | Guo et al. |
| 10,719,239 B2 | 7/2020 | Rowstron et al. |
| 10,748,582 B1 | 8/2020 | Feist |
| 10,810,512 B1 | 10/2020 | Wubbels et al. |
| 10,817,441 B2 | 10/2020 | Kumar et al. |
| 10,861,320 B2 | 12/2020 | Martin et al. |
| 10,901,628 B2 | 1/2021 | Das et al. |
| 10,963,394 B2 | 3/2021 | Kachare et al. |
| 10,990,092 B2 | 4/2021 | Ghosh et al. |
| 11,243,711 B2 | 2/2022 | Sato et al. |
| 11,257,002 B2 | 2/2022 | Faulhaber et al. |
| 11,295,209 B2 | 4/2022 | Thiruvengadam et al. |
| 11,320,165 B2 | 5/2022 | Venkatesh et al. |
| 11,435,924 B2 | 9/2022 | Akutsu et al. |
| 11,449,796 B2 | 9/2022 | Song et al. |
| 11,503,615 B2 | 11/2022 | Hu et al. |
| 11,507,860 B1 | 11/2022 | Hodgman et al. |
| 11,521,017 B2 | 12/2022 | Abelha Ferreira et al. |
| 11,531,831 B2 | 12/2022 | Jia et al. |
| 11,587,156 B2 | 2/2023 | Morin et al. |
| 11,592,984 B2 | 2/2023 | Tiotantra et al. |
| 11,734,143 B2 | 8/2023 | Raz et al. |
| 11,790,766 B2 | 10/2023 | Martin et al. |
| 11,861,467 B2 | 1/2024 | Gadelrab et al. |
| 11,932,274 B2 | 3/2024 | Woo et al. |
| 2003/0078680 A1 | 4/2003 | Edwards et al. |
| 2008/0180084 A1 | 7/2008 | Dougherty et al. |
| 2010/0169603 A1 | 7/2010 | Perry et al. |
| 2011/0289029 A1 | 11/2011 | Bisdikian et al. |
| 2013/0132638 A1 | 5/2013 | Horn et al. |
| 2015/0221333 A1 | 8/2015 | Hwang et al. |
| 2018/0053401 A1 | 2/2018 | Martin et al. |
| 2018/0197574 A1 | 7/2018 | Guo et al. |
| 2018/0349103 A1 | 12/2018 | Brown et al. |
| 2019/0156247 A1 | 5/2019 | Faulhaber et al. |
| 2019/0179547 A1 | 6/2019 | Szubbocsev |
| 2019/0317901 A1 | 10/2019 | Kachare et al. |
| 2019/0354283 A1 | 11/2019 | Rowstron et al. |
| 2020/0293200 A1* | 9/2020 | Das ...................... G06F 3/0676 |
| 2020/0301595 A1* | 9/2020 | Akutsu ................ G06F 3/0605 |
| 2020/0310993 A1 | 10/2020 | Kumar et al. |
| 2020/0387152 A1 | 12/2020 | Ghosh et al. |
| 2021/0097329 A1 | 4/2021 | Jia et al. |
| 2021/0174238 A1 | 6/2021 | Song et al. |
| 2021/0192333 A1* | 6/2021 | Thiruvengadam ... G11C 29/028 |
| 2021/0199328 A1* | 7/2021 | Venkatesh ................ F24F 11/64 |
| 2021/0204300 A1 | 7/2021 | Hu et al. |
| 2021/0233388 A1 | 7/2021 | Martin et al. |
| 2021/0240381 A1 | 8/2021 | Sato et al. |
| 2021/0279635 A1 | 9/2021 | Gadelrab et al. |
| 2021/0319354 A1* | 10/2021 | Raz ...................... G06F 11/3495 |
| 2021/0334597 A1* | 10/2021 | Abelha Ferreira .... G06N 5/025 |
| 2021/0357783 A1* | 11/2021 | Cogan ................... G06Q 10/04 |
| 2021/0366031 A1* | 11/2021 | Morin ................... G06V 10/25 |
| 2021/0380127 A1* | 12/2021 | Woo ................. B60W 60/0015 |
| 2022/0083230 A1 | 3/2022 | Tiotantra et al. |
| 2022/0188028 A1* | 6/2022 | Mesnier ................. G06F 3/067 |
| 2022/0405635 A1* | 12/2022 | Zhang ................... G06Q 10/04 |
| 2024/0054384 A1 | 2/2024 | Catron et al. |

* cited by examiner

EMBEDDED MULTI-ATTRIBUTE MACHINE LEARNING FOR STORAGE DEVICES

PRIORITY

This application claims the benefit of and priority to U.S. Provisional Application No. 63/094,067, filed Oct. 20, 2020, which is incorporated in its entirety herein.

FIELD

The present disclosure relates to storage systems. More particularly, the present disclosure relates to utilizing machine learning methods within storage devices to generate inferences based on multiple types of data.

BACKGROUND

Current hard disk drive ("HDD") and solid state drive ("SSD") storage devices often utilize embedded software that is executed within a System on a Chip ("SoC"). Traditional methods of software execution within storage systems are getting increasingly difficult to improve. As drive sizes and complexity grows, the number of variables and associated resources that need to be managed, searched, and optimized to improve on the state-of-the-art increases in complexity.

Certain algorithms may attempt to improve various operations within storage devices but often are limited by the internal processing power provided. Some methods of processing improvement may attempt to offload processing to an external host system either in direct communication with the storage device or via a remote processing device. However, these methods add complexity to the storage device system and can be rendered useless when communication fails with the external processing devices.

Improving internal processing power within the storage device can also be problematic. Adding additional processors or specialized components to handle various processing tasks often require an entire reworking of the circuits, circuit-boards and/or other hardware. These changes are not trivial and can add millions of dollars in capital investment costs to the manufacturing process. These hardware-based solutions may also be limited to address a particular problem whose solution may not warrant the costs needed to produce a change in hardware design.

BRIEF DESCRIPTION OF DRAWINGS

The above, and other, aspects, features, and advantages of several embodiments of the present disclosure will be more apparent from the following description as presented in conjunction with the following figures.

Figure 1:
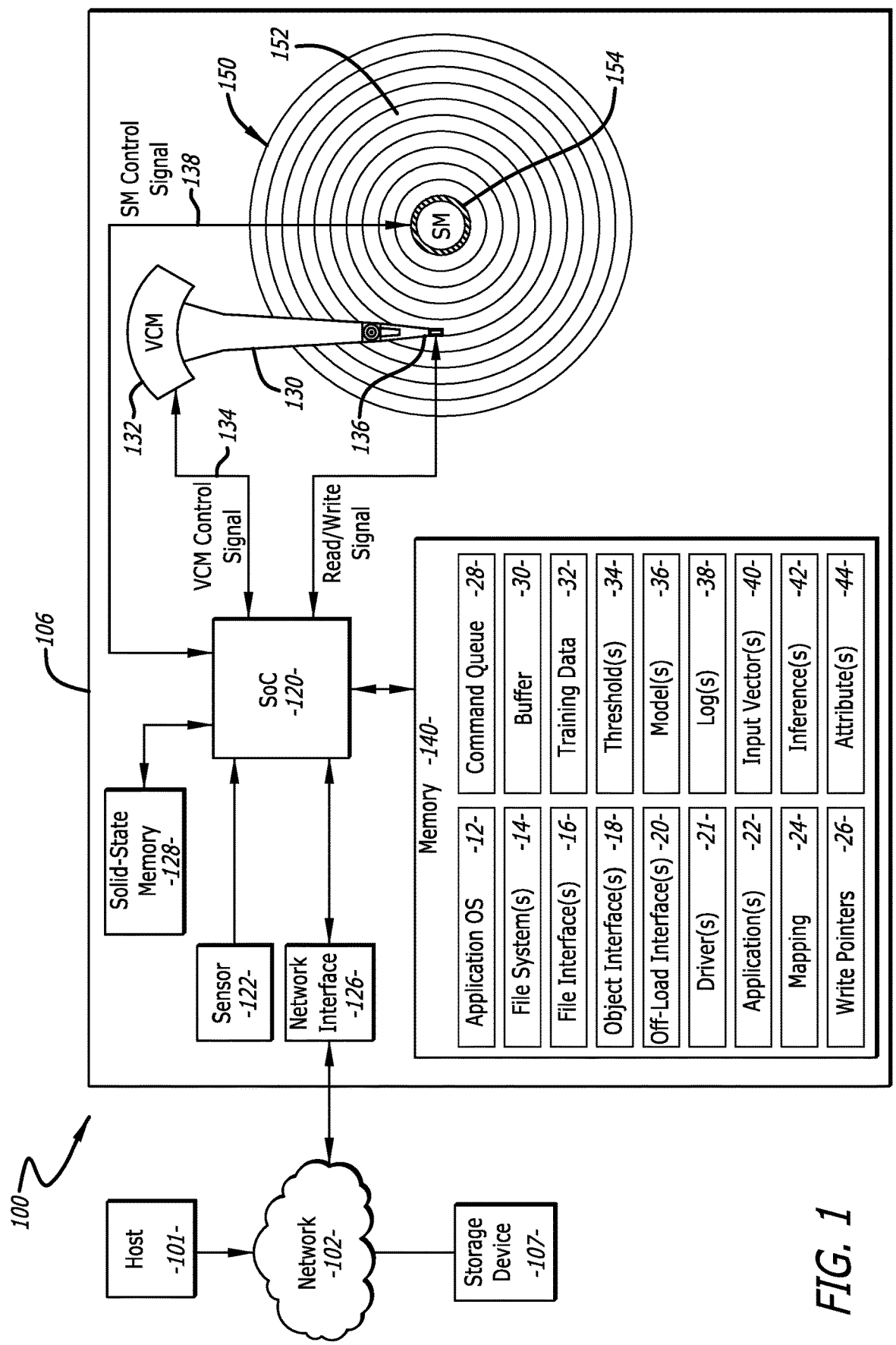
FIG. 1 is a block diagram of a storage device system in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the problems described above, various embodiments of the instant disclosure provide for tactical deployment of machine learning within existing storage device designs without additional capital investment. In many embodiments machine learning operations can be processed within a SoC of a storage device as embedded software. By utilizing prior historical data, operations, and/or results, statistically driven decisions (i.e. inferences) can be generated.

Machine learning methods can be utilized by generating one or more models that receive a series of input data and produces a desired output. Often, these machine learning models are produced by using one or more neural network designs. Challenges often occur operating machine learning models within typical storage device firmware as the input and output scope can vary greatly and may not be known prior to firmware development.

However, various embodiments of the instant application can provide methods of dynamically generating and implementing machine learning models of different attributes such as parameters, features, and/or scopes as needed. For example, adjustments of the models can be designed to adjust for model complexity and/or projected processing time. It is contemplated that models of various complexities can be generated, selected, converted, and otherwise processed as needed to be run as code within the embedded software of the storage device.

Data can be processed between a variety of different attributes within a data set. Attributes can include various features within the storage device itself, attributes that vary in scope which may or may not be related, and/or can be formatted as parameterized data that may be suitable for input into a parametric search. For example, in some embodiments, data necessary for the calculation of one type of attribute may not be available but may be generated via a machine learning model that accepts input data comprised of a second type of attribute data. In further embodiments, the first and second attribute data types may be related and/or could be different in scope. In general, a scope of attribute data may be understood as a grouping of similar attributes within the same level of a hierarchy. For example, as shown in more detail within the discussion of FIGS. 10A-10B, an HDD may have a physical hierarchy of scopes including platters, zones, tracks, and sectors. Each scope (or level) of the hierarchy may comprise one or more attributes that are associated only with that scope. Therefore, when processing data corresponding to both tracks and zones, the data comprises two separate scopes of attribute data types. The preceding example is not meant to be limiting and it is contemplated that additional scopes may be utilized that don't have a direct physical connection and may exist within an unrelated hierarchy. Generation of various attribute data via machine learning models may also be realized through summation of various related feature (i.e. sub-feature) data or by processing data that is physically related to the desired attribute data (e.g., physically associated attributes).

Machine learning based techniques can allow for an arbitrary amount of calculation complexity to be encapsulated in an information dense and efficient way. The accuracy of a model can be configured to be tuned to trade off the calculation time versus accuracy without the need for a firmware engineer to make an excessive amount of manual adjustments. These machine learning models can be designed to, for example, improve the accuracy of performance, reliability, manufacturing margins, yield increases, and/or manufacturing cost reduction. In further embodiments, an analyst or data scientist can define more appropriate or efficient function for a particular model which may then be updated via a firmware update without the need for further changes to the remaining software code.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a block diagram of a storage device system 100 in accordance with an embodiment of the disclosure is shown. The system 100 can include a host 101 and storage devices 106 and 107 in communication with each other through a network 102. The system 100 can be, for example, a data storage center or other computer system that uses multiple storage devices. In addition, system 100 may be a standalone system or part of a network, such as network 102, which can, for example, be a local or wide area network, or the Internet. Those of ordinary skill in the art will appreciate that system 100 can include more or less than those elements shown in FIG. 1 and that the disclosed processes can be implemented in other environments. For example, in other embodiments system 100 may only include host 101 and storage device 106 without storage device 107. In such embodiments, system 100 can be, for example, a computer system (e.g., server, desktop, mobile/laptop, tablet, smartphone, etc.) or another electronic device such as a digital video recorder or other consumer entertainment device.

In the embodiment depicted in FIG. 1, the storage device 106 can includes one or both of solid-state memory 128 and rotating magnetic disk 150 as Non-Volatile Memory ("NVM") for storing data. If both are included, storage device 106 can be considered a Solid-State Hybrid Drive ("SSHD") in that it includes both solid-state and disk NVM. In other embodiments, storage devices 106 or 107 can include different types of NVM such as, for example, a magnetic tape drive, or the NUM of storage devices 106 or 107 may only disk NVM or solid-state NVM. In yet other embodiments, each of disk 150 or solid-state memory 128 may be replaced by multiple HDDs or multiple Solid-State Drives ("SSDs"), respectively, so that the storage device 106 can include pools of HDDs or SSDs.

The embodiment of FIG. 1 also depicts the storage device 106 including a System on a Chip ("SOC") 120 which includes circuitry for executing instructions and can include a micro controller, a Digital Signal Processor (DSP), an Application Specific Integrated Circuit (ASIC), a Field Programmable Gate Array (FPGA), hard-wired logic, analog circuitry and/or a combination thereof. An example arrangement of a SoC 120 is discussed in more detail below with reference to FIG. 2.

A network interface 126 is configured to connect the storage device 106 with a network 102 using, for example, an Ethernet connection or a Wi-Fi wireless connection. Network interface 126 allows storage device 106 to interface with other devices on network 102 (e.g., host 101 or storage device 107) using a protocol such as TCP/IP. As will be appreciated by those skilled in the art, network interface 126 can be included as part of the SoC 120. In other embodiments, the network interface 126 may be replaced with an interface for communicating on a data bus according to a standard such as Serial Advanced Technology Attachment ("SATA"), PCI express ("PCIe"), Small Computer System Interface ("SCSI"), or Serial Attached SCSI ("SAS").

The storage device 106 can also include a sensor 122 for obtaining environmental information about an environmental condition of the storage device 106. The sensor 122 can include one or more environmental sensors such as, by way of non-limiting disclosure, a mechanical shock sensor, a vibration sensor, an accelerometer (e.g., XYZ or YPR accelerometer), a temperature sensor, a humidity sensor, or an air pressure sensor. In addition, one type of sensor can be used to indicate multiple environmental conditions. For example, an accelerometer can be used to indicate both vibration and mechanical shock conditions or an air pressure sensor can be used to indicate changes in altitude and changes in air pressure. In other embodiments, storage device 106 may obtain data from an external sensor such as a camera, a radio frequency sensor, or radar.

The disk 150 can be rotated by a Spindle Motor ("SM") 154. The storage device 106 may also include a head 136 connected to the distal end of an actuator 130 which is rotated by Voice Coil Motor ("VCM") 132 to a position head 136 in relation to the disk 150. The SoC 120 can control the position of the head 136 and the rotation of the disk 150 using a VCM control signal 134 and a SM control signal 138, respectively.

As appreciated by those of ordinary skill in the art, the disk 150 may form part of a disk pack with additional disks radially aligned below disk 150. In addition, the head 136 may form part of a head stack assembly including additional heads with each head arranged to read data from and write data to a corresponding surface of a disk in a disk pack.

The disk 150 includes a number of radial spaced, concentric tracks 152 for storing data on a surface of disk 150. Tracks 152 can be grouped together into zones of tracks with each track divided into a number of sectors that are spaced circumferentially along the tracks. In some embodiments, some or all of tracks 152 can be written by a write element of head 136 using Shingled Magnetic Recording ("SMR") so as to overlap adjacent tracks. SMR provides a way of increasing the amount of data that can be stored in a given area on disk 150 by overlapping tracks like roof shingles. The non-overlapping portion then serves as a narrow track that can be read by a read element of head 136. In other implementations, all of tracks 152 may be written such that they do not overlap by using Conventional Magnetic Recording ("CMR").

In addition to, or in lieu of the disk 150, the NVM media of the storage device 106 may also include solid-state memory 128 for storing data. While the description herein refers to solid-state memory generally, it is understood that solid state memory may comprise one or more of various types of memory devices such as flash integrated circuits, Chalcogenide RAM ("C-RAM"), Phase Change Memory ("PC-RAM" or "PRAM"), Programmable Metallization Cell RAM ("PMC RAM" or "PMCm"), Ovonic Unified Memory ("OUM"), Resistance RAM ("RRAM"), NAND memory (e.g., Single-Level Cell ("SLC") memory, Multi-Level Cell ("MLC") memory, or any combination thereof), NOR memory, EEPROM, Ferro electric Memory ("Fe-RAM"), Magnetoresistive RAM ("MRAM"), other discrete NVM chips, or any combination thereof.

Memory 140 can represent a volatile memory of storage device 106, such as Dynamic Random Access Memory ("DRAM"), for temporarily storing data used by SoC 120. In other embodiments, memory 140 can be an NVM such as MRAM. In addition, memory 140 can be included as part of SoC 120 in other embodiments. Those of ordinary skill in the art will also appreciate that other embodiments may include less than all of the items depicted as being stored in memory 140.

In operation, a processor of SoC 120 (e.g., processor 210 shown in FIG. 2) accesses information stored in memory 140 during execution of computer-executable instructions in software programs such as application Operating System (OS) 12, file system(s) 14, driver(s) 21, or application(s) 22. More specifically, SoC 120 can load computer-executable instructions from an NVM of storage device 106 (e.g., disk 150 or solid-state memory 128) into a region of memory 140 and then execute the stored process instructions from memory 140.

Application OS 12 can be an embedded OS or firmware of the storage device 106 in the sense that application OS 12 is executed on storage device 106 and not executed on a host such as host 101. Hardware resources managed by application OS 12 can include, for example, the network interface 126, solid-state memory 128, disk 150, memory 140, and one or more processors in SoC 120 (e.g., processor 210 shown in FIG. 2). Software resources managed by application OS 12 can include, for example, file system(s) 14, driver(s) 21, or application(s) 22.

File system(s) 14 can include one or more file systems for accessing or organizing files stored in NVM of storage device 106. By executing a file system on storage device 106, it is ordinarily possible to tailor the file system to a particular storage media used by storage device 106 to store data. In one example, file system(s) 14 can include a file system that may be well suited to sequentially writing data on SMR media, such as Linear Tape File System ("LTFS") or a log-structured file system like New Implementation of a Log-structured File System ("NILFS"). Other file systems of file system(s) 14 can include, for example, B-tree file system ("BTFS"), ext2, ext3, ext4, or XFS.

Figure 2:
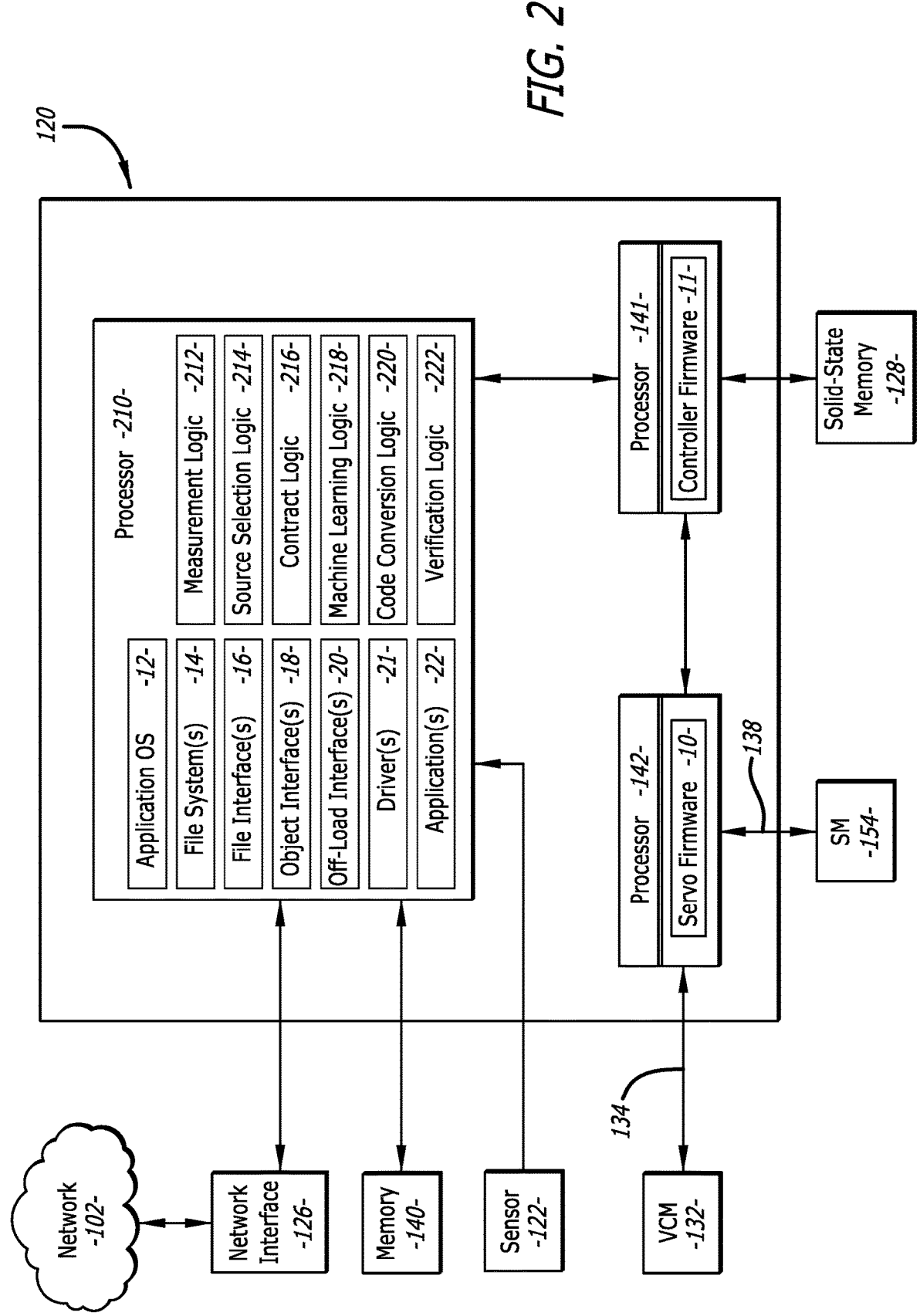
FIG. 2 is a block diagram of a System on a Chip (SoC) of a storage device in accordance with an embodiment of the disclosure.

Driver(s) 21 can include software for interfacing with a firmware or other software of the storage device 106 (e.g., controller firmware 11 or servo firmware 10 as shown in FIG. 2, or a firmware of network interface 126) and can execute in a kernel space of application OS 12. Driver(s) 21 can also allow for interfacing with other devices on network 102 such as storage device 107.

Application(s) 22 can include applications developed by a manufacturer of the storage device 106 and/or independently developed applications that have been downloaded from network 102. For example, the storage device 106 may receive computer executable instructions from a host 101 via the network interface 126 and then execute the computer-executable instructions to create an application 22. In some implementations, a Software Development Kit (SDK) could be made available to allow customer and/or vendors on network 102 to develop their own applications to run on storage device 106.

Application(s) 22 or driver(s) 21 can include data storage related applications such as a user interface for operating storage device 106, storage device health monitoring for monitoring a reliability of storage device 106 and/or migrating data to another storage device or NVM within storage device 106 before losing data, data encryption, data compression, era sure coding or error correction, directing data for storage on disk 150 or solid-state memory 128 based on attributes of the data (e.g., tiered storage), deduplication of data stored in storage device 106, or mirroring data (e.g., data backup).

In addition, application(s) 22 or driver(s) 21 can customize the storage device 106 for specific uses such as working with sensor data, streaming certain types of media over network 102, configuring storage device 106 to operate as a DVR or media server, managing the synching or backup of computing devices, providing a Bluetooth connection, a Wi-Fi hotspot, or configuring the storage device 106 to operate as a Network-Attached Storage (NAS). In one embodiment, an application 22 can allow a processor of the storage device 106 (e.g., processor 210 of SoC 120 shown in FIG. 2) to monitor at least one indicator of a reliability of another storage device on network 102 (e.g., storage device 107) for storing data with the use of network interface 126. An indicator of reliability could include, for example, a number of errors in retrieving or storing data on the other storage device or an amount of use of a particular NVM of the other storage device, such as a number of Program/Erase (P/E) cycles for a flash memory of the other storage device. In some cases, the application 22 may also cause a processor of storage device 106 to copy data from another storage device to an NVM of storage device 106 if one or more indicators of reliability for the other storage device reach an unsafe or undesirable threshold.

In another implementation, an application 22 can cause a processor of the storage device 106 to receive an input from the sensor 122 indicating an environmental condition of storage device 106 such as a vibration condition, an air pressure condition, a humidity condition, or a temperature condition. The processor can then determine whether the input exceeds an unsafe or undesirable threshold. If the input exceeds the threshold, the processor can redirect at least one command to store data in NVM of storage device 106 to another storage device on network 102 (e.g., storage device 107). The processor may also request environmental condition information from other storage devices on network 102 to identify another storage device to receive one or more redirected commands. In addition, the processor may stop redirecting commands if a subsequent input from sensor 122 indicates that the subsequent input has fallen below a threshold, thereby indicating that it is safe to store data in an NVM of storage device 106.

Data included in mapping 24, write pointers 26, command queue 28, buffer 30, or data to be stored in or retrieved from NVM can also be stored in memory 140 so that the data can be accessed by a processor of storage device 106 (e.g., processor 210 shown in FIG. 2) during execution of software programs to the extent that such software programs have a need to access and/or modify the data. In addition to shifting processing from host 101 to storage device 106, running application OS 12 at storage device 106 can allow for shifting tasks to file system(s) 14, and/or application(s) 22 that may otherwise have been performed by firmware (e.g., controller firmware 11 shown in FIG. 2) of storage device 106. In addition to the tasks mentioned above of data encryption, data compression, erasure coding or other error correction, the direction of data for storage on disk 150 or solid-state memory 128, deduplication of data, and data mirroring, a processor of storage device 106 (e.g., processor 210 shown in FIG. 2) executing file system(s) 14, driver(s) 21, or application(s) 22 can use mapping 24, write pointers 26, command queue 28, and buffer 30 to perform other tasks related to the management of storage media in storage device 106. By moving one or more such tasks from a firmware of storage device 106 to a file system 14, application 22, or driver 21 executed on a processor of storage device 106, the tasks can be more easily modified in the field and the firmware of storage device 106 can be simplified.

In various embodiments, mapping 24 can map logical addresses (e.g., Logical Block Addresses ("LBAs")) for data to physical addresses (e.g., block addresses) corresponding to locations in NVM of storage device 106 that store the data. This can allow for a processor executing application OS 12 to direct data to a particular NVM (e.g., disk 150 or solid-state memory 128) or particular zones within an NVM based on attributes of the data. Mapping 24 may also be stored in an NVM of storage device 106 such as disk 150 or solid-state memory 128 so that mapping 24 is available after storage device 106 has been powered off. Alternatively, memory 140 may be an NVM such as MRAM.

Write pointers 26 can be used by a processor executing application OS 12 to keep track of a location for performing a next write in a sequentially written zone such as an SMR zone on disk 150. Write pointers 26 may also be stored in an NVM of storage device 106 such as disk 150 or solid-state memory 128 so that write pointers 26 are available after storage device 106 has been powered off.

Buffer 30 may be used by a processor executing application OS 12 in performing various operations including, but not limited to, Read-Modify-Write ("RMW") operations on the disk 150, such as garbage collection to reclaim portions of disk 150 storing invalid or obsolete data. In these operations, the processor may read a zone of tracks and store the valid data from the zone in buffer 30 before rewriting the valid data on disk 150. In addition, the processor may identify or prioritize a particular zone for garbage collection by determining a level of invalid or obsolete data stored in the zone and/or a frequency of use of the zone.

Training data 32 may be used by a logics and/or other software in order to facilitate generation of one or more machine learning models. Training data 32 may include, but is not limited to weights, connection data, historical results of previous machine learning model outputs. In some embodiments, training data 32 may be generated and installed on the storage device during the manufacturing process and remain static. In additional embodiments, training data 32 can be dynamically generated and utilized in the updating of existing or creation of new machine learning models.

Threshold(s) 34 can include values, ranges, or other data that can be used in a verification process. As shown in more detail below with respect to the discussion of FIG. 9, each output of a machine learning model can be verified prior to utilization within the storage device. Threshold(s) 34 can be utilized in the verification process to compare against the output data (i.e. inference(s) 42) generated by the machine learning models. The storage device may be configured to utilize multiple threshold(s) 34 either together in a single evaluation, or in a series of successive verification steps.

Threshold(s) 34 may also be statically set during manufacture and/or dynamically created and adjusted based on newly received data.

Model(s) 36 refer to one or more machine learning-based model(s) 36 that can generate inference data in response to receiving an input vector(s) 40 to process. As discussed in more detail below, machine learning model(s) 36 may be installed during manufacture of the storage device or be included within a software or firmware update process. In certain embodiments, new model(s) 36 may be dynamically generated and/or adjusted based on newly processed or received data. For example, a model 36 may be generated to evaluate a property on each head within the hard-disk memory. However, the number of sectors or heads to evaluate within the model 36 may decrease due to bad sectors accumulating over time. In these cases, each model(s) 36 may need to be adjusted to account for these changes in items to evaluate with the model(s) 36.

Log(s) 38 are data stores that are comprised of data pieces that reflect how one or more operations within the storage device have occurred. As those skilled in the art will recognize, virtually any type or variety of log (s) 38 may be stored within a memory of the storage device. Log(s) 38 may be stored as a text-based file format, but there is no direct limitation to the type of data format may incorporate log(s) 38 for the purposes of generating inference(s) 42 based on that data.

Input Vector(s) 40 are data structures that are specifically formatted to deliver data into one or more input nodes within a machine learning model(s) 36. As discussed in more detail below, each model 36 may vary in size, complexity, and types of input desired and output produced. The storage device may often evaluate a machine learning based model 36 and determine a suitable way to pass data into it in order to facilitate a productive output (i.e. inference 42). Input vector(s) 40 are often generated from and associated with contract data which tracks not just the input vector(s) 40, but also the output format as well.

Inference(s) 42 are a term for the generalized output of a machine learning model 36. As highlighted within the discussions of FIGS. 4-6, inferences can be generated in lieu of utilizing a traditional measurement or other data request. For example, a series of steps to complete a process may be broken down such that a plurality of steps may be skipped over as the necessary input data needed can be sufficiently generated from the inference(s) 42. In many embodiments, the inference(s) 42 may be directly passed to the process that requested the data or given to a subsequent step in the process to increase overall storage system efficiencies.

Attribute(s) 44 are data or characteristics which are related to the type of data that is being processed. In a variety of embodiments, data to be processed within the machine learning model(s) 36 may be associated with one or more physical attributes of the storage device. As explained in more detail within the discussion of FIGS. 10A-10B, storage devices such as HDDs may have a variety of physical features that can be processed as attributes 44 of various scopes. In some embodiments, the formatting of attributes 44 may be parameterized such that it may be utilized as input data within a parametric search or other optimization method. It is contemplated that a variety of attributes 44 may be associated with data processed by one or more machine learning models 36. Examples of processing attribute(s) 44 with machine learning models 36 are described in more detail within the discussion of FIGS. 11 and 12.

Referring now to FIG. 2, a block diagram of a System on a Chip (SoC) 120 of a storage device in accordance with an embodiment of the disclosure is shown. The SoC 120 may include processors 210, 141, and 142. In other embodiments, one or more of processors 210, 141, and 142 may be located on different chips such that not all of processors 210, 141, and 142 are located within SoC 120. Additionally, processors 141 and 142 may be combined into one processor or 142 may serve as co-processors of processor 210 in other embodiments.

In a number of embodiments, each of processors 210, 141, and 142 is a processor core such as, but not limited to, an ARM M3 processor. In additional embodiments, the processor 210 can include an ARM A5 or A6 processor while processors 141 and 142 can be ARM M3 processors. In yet further embodiments, different types of processors such as those based on a RISC-V ISA can be used.

As shown in the embodiment depicted in FIG. 2, processor 210 can execute application OS 12, file system(s) 14, driver(s) 21, and application (s) 22. Processor 210 can interface with memory 140 in executing such software and can further interface with the network interface 126 in communicating via network 102 when needed.

In many embodiments, the processor 210 may additionally operate and/or execute a plurality of logics that are utilized to facilitate machine learning within the SoC 120. As shown in the embodiment of FIG. 2, these logics can include a measurement logic 212, source selection logic 214, contract logic 216, machine learning logic 218, code conversion logic 220, and/or verification logic 222. Each of these logics will be discussed in more detail below and can access data stored within the memory 140. As those skilled in the art will recognize, each of the logics 212, 214, 216, 218, 220, 222 may be implemented as software applications that are loaded or otherwise derived from the applications 22.

As discussed above, having an application OS 12 embedded or running on the storage device 106 can provide several advantages over conventional storage devices that do not locally execute an embedded application OS. Such advantages include the ability to support TCP/IP over Ethernet or Wi-Fi interfaces (e.g., via the network interface 126), the ability to embed a file system (e.g., file system(s) 14) that may be better adapted to a particular storage media of storage device 106, and to allow for new applications and/or logics (e.g., application(s) 22) to be developed for different uses of storage device 106. As will be appreciated by those of ordinary skill in the art, one or both of processors 141 and 142 may run a Real-Time Operating System ("RTOS") that is intended to perform real-time processes for components such as, but not limited to, servo firmware 10 and/or controller firmware 11. In contrast, processor 210 can run application OS 12 which allows for the execution of software as discussed in more detail below.

In storing or retrieving data from the NVM of a storage device 106, the processor 210 can execute application OS 12 to interface with processor 141, which executes controller firmware 11. Controller firmware 11 can then control operation of the NVM of storage device 106 and may be stored in a dedicated memory of the SoC 120 (e.g., a flash memory not shown) or may be stored on another NVM of the storage device 106 such as the disk or solid-state memory 128.

As noted above, the use of an application OS at processor 210 can allow for a simplified firmware of the storage device 106. In more detail, many of the tasks conventionally performed by executing storage device firmware may be shifted to software executed by the processor 210. As a result, controller firmware 11 in some implementations may primarily serve only to store or retrieve data in NVM with many of the maintenance operations for the NVM being performed by the file system(s) 14, driver(s) 21, and/or application(s) 22. Tasks that may be shifted to processor 210 can include, for example, data encryption, data compression, erasure coding or other error correction, data deduplication, data mirroring, the direction of data for storage on disk or solid-state memory 128 based on attributes of the data, the direction of data for storage in a CMR zone (i.e., a zone of non-overlapping tracks) or an SMR zone (i.e., a zone of overlapping tracks) of a disk based on attributes of the data, address mapping, maintenance of write pointers, ordering of command queues, garbage collection, and/or other storage device optimizations.

In many embodiments, the processor 210 can execute an application OS 12 to interface with a processor 141 and send a command to processor 141 to retrieve data from or store data in the disk or solid-state memory 128. The interface between the processor 210 and processor 141 can be object based, use a standard such as SAS or SATA, or be a custom interface. In the case of using a standard such as SAS or SATA, the processor 210 can use a file system 14, or a driver 21 to send read, write, or trim commands for particular LBAs associated with the data. In the case of a custom interface, a manufacturer may provide a customized file system 14 or a driver 21 to send commands to processor 141.

If access to the disk is needed, processor 141 can communicate with processor 142, which may execute servo firmware 10. In this regard, processor 142 controls SM 154 via a SM control signal 138 to rotate the disk. Processor 142 can also control VCM 132 via a VCM control signal 134 to position a head over the disk.

Measurement logic 212 can be a series of circuits, software, and/or operations that can gather one or more measurements within the storage device. Measurements can include properties of the storage device, a memory within the storage device, and/or any external properties such as environmental factors. In many embodiments, measurement logic can gather and process these measurements via non-machine learning-based methods. However, as discussed in more detail above, the determination of measurements via the measurement logic may be too computationally intensive, take too much time, and/or would be requesting resources that are not available.

In certain embodiments, source selection logic 214, can evaluate a request for measurements or other data and determine if generating one or more inferences via machine learning models is suitable. In this way, source selection logic 214 can change the destination paths of data requests which may allow for the potential increase in efficiency by incorporating one or more machine learning models. Source selection logic 214 can be configured to utilize historical data and/or projected computational costs when determining if utilizing machine learning models is appropriate.

Contract logic 216 can be configured to determine and generate proper data inputs and outputs of a machine learning model. As discussed in more detail below, each machine learning model can be uniquely configured to receive a particular type of input data and associated output format. For example, a machine learning model may be constructed to receive two numerical inputs and two alpha-numeric inputs which are then processed to receive a single numerical value. In many embodiments, contract logic 216 can facilitate the steps necessary for the storage device to acquire the two numeric inputs from a first location within a log while retrieving the two alphanumeric inputs from a second location within the log. The same contract logic 216 can provide facilitate processing and/or passing the generated inference output data to a proper location within the storage device. In this way, contract logic 216 can generate a specific contract associated with, and often paired with, each individual machine learning model.

In a number of embodiments, machine learning logic 218 can encompass all operations necessary to facilitate machine learning with a storage device. In certain embodiments, the nature of machine learning logic 218 scope may be limited to simply providing and administering machine learning models that interact with other, separate logics. Machine learning logic 218, can in some embodiments, facilitate the communication between the various logics within the storage device.

For example, in one embodiment, machine learning logic 218 may access one or machine learning models stored within memory, summarize or otherwise provide these model(s) to the source selection logic 214 which may determine if one or more of the model(s) would be suitable for execution instead of traditional measurements or processing. Upon selection, machine learning logic 218 can then facilitate contract logic 216 to facilitate assembly of an input vector which can then be passed into the machine learning model for processing. Upon completion of processing, the generated inference output data can then be passed back to the requesting application.

Prior to execution within the storage device, the various machine learning models, associated contracts and other related data must be converted from their various formats into machine-executable source code. In various embodiments, this conversion can be facilitated by code conversion logic 220. A storage device may be configured to accept a plurality of different file formats that represent machine learning models which may be subsequently converted into embedded source code. The code conversion logic 220 can, in some embodiments, be a compiler that generates one or more source code files from various input file formats.

Although many embodiments discussed herein utilize machine learning models to increase overall storage device processing efficiently, novel instances and input variables can potentially provide undesirable or otherwise unusable inference output data. Recognizing this, some embodiments can utilize verification logic 222 which may evaluate the generated inference output data before it is utilized by the storage device. Verification processing is discussed in more detail in FIGS. 4 and 9.

Verification logic 222 can access on or more thresholds stored in memory and then compare the generated inference output data against these thresholds. The comparisons may be a simple numerical difference analysis, but may involve more complex, multi-dimensional analysis depending on the type of inference data generated by the machine learning model. The thresholds used for comparison can be static values stored in memory which were added during the manufacturing process. In further embodiments, thresholds may be dynamically generated, such as for example, in response to gathered historical data or other previously verified results.

When inference data fails to be verified (such as when the value exceeds a threshold), the verification logic 222 may send a signal to the measurement logic 212 to perform a non-machine learning-based measurement or other traditional data generation/retrieval. The results of the verification failure (including the rejected value(s)) may then be stored within one or more logs within the storage device. In this way, the storage device can avoid utilizing faulty values generated by machine learning models.

Figure 3:
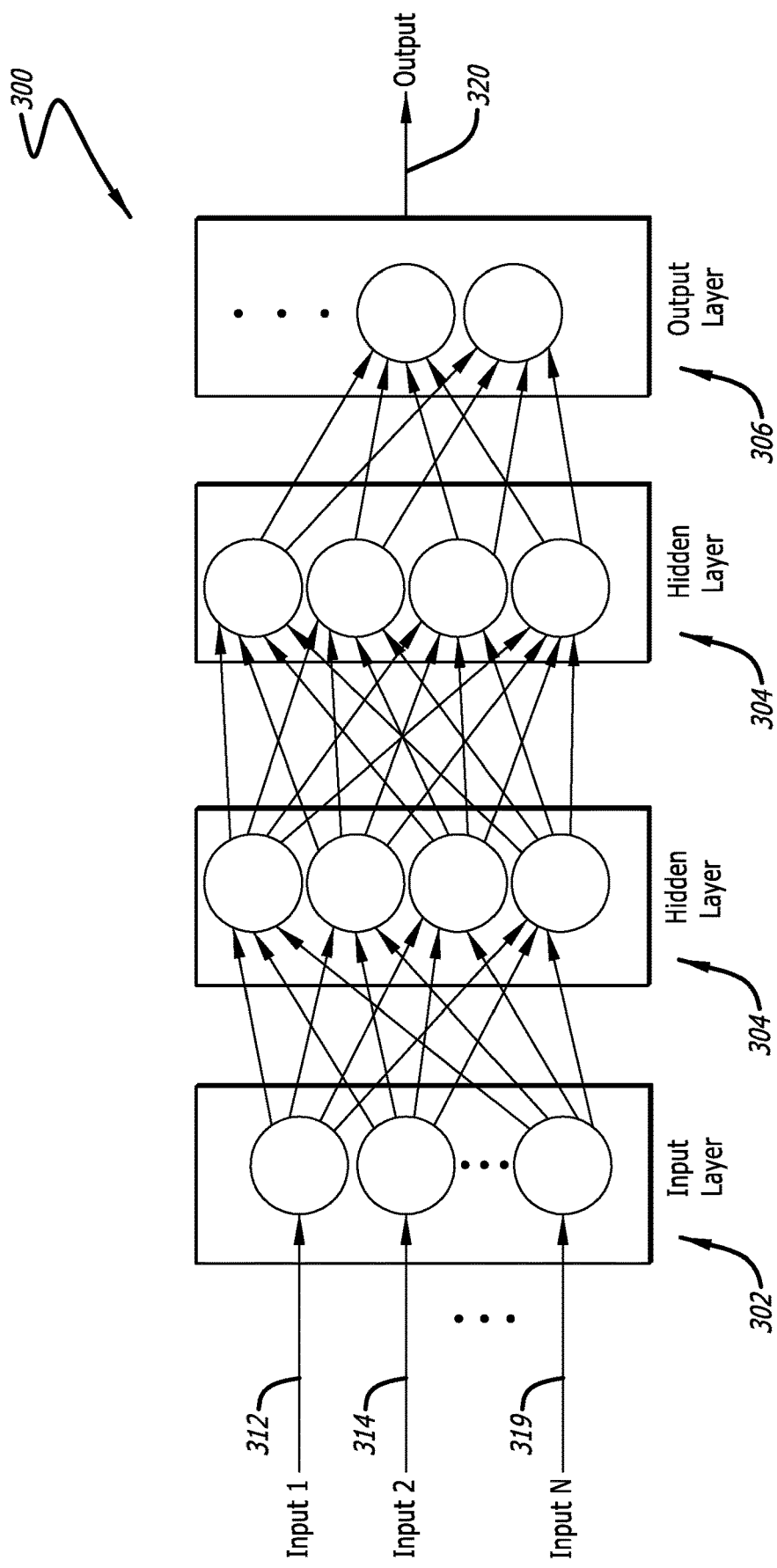
FIG. 3 is a conceptual illustration of a neural network utilized in machine learning models in accordance with an embodiment of the disclosure.

Referring to FIG. 3, a conceptual illustration of a neural network 300 utilized in machine learning models in accordance with an embodiment of the disclosure is shown. As discussed above, neural networks can be utilized within machine learning algorithms in order to generate an inference as output from a specified set of inputs 312, 314, 319. The neural network depicted in FIG. 3 is a simplified example intended to illustrate the general concept that may be utilized in various embodiments with more complexity. At a high level, the neural network 300 comprises an input layer 302, a plurality of hidden layers 304, and an output layer 306. The neural network 300 comprises a collection of connected units or nodes typically called artificial neurons which often loosely model the neurons in a biological brain. Each connection, like the synapses in a biological brain, can transmit a signal from one artificial neuron to another. An artificial neuron that receives a signal can process the signal and then trigger additional artificial neurons within the next layer of the neural network. The result of what output to generate at each node is usually associated with the strength and number of signals/inputs 312, 314, 319 received, as well as the general weighting of each signal internally within the node.

In a typical embodiment, the signal at a connection between artificial neurons is a real number, and the output of each artificial neuron is computed by some non-linear function (called an activation function) of the sum of the artificial neuron's inputs. The connections between artificial neurons are often called "edges" or axons. As mentioned above, artificial neurons and edges typically have a weight that adjusts as learning proceeds. The weight can increase or decrease the strength of the signal at a connection. Artificial neurons may have a threshold (trigger threshold) such that the signal is only sent if the aggregate signal crosses that threshold. Typically, artificial neurons are aggregated into layers as shown in FIG. 3. Different layers may perform different kinds of transformations on their inputs. Signals can propagate from the first layer (the input layer 302), to the last layer (the output layer 306), possibly after traversing one or more intermediate layers, called hidden layers 304.

The inputs 312, 314, 319 to a neural network may vary depending on the problem being addressed. In the embodiment depicted in FIG. 3, the input layer 302 comprises a first input (i.e. input 1) 312, a second input (i.e. input 2) 314 up to a final input (i.e. input N) 319. In a drive optimization measurement, for example, the inputs may be values associated with each head or zone within the storage device disk. In one embodiment the neural network 300 may comprise a series of hidden layers 304 in which each neuron is fully connected to neurons of the next layer. The neural network 300 can utilize an activation function such as a sigmoid or a rectified linear unit ("ReLU"), for example. The last layer in the neural network may implement a regression function to produce a classification or other inference as output data 320.

In certain embodiments, the neural network 300 is trained prior to deployment into the field. However, some embodiments may utilize ongoing training of the neural network 300 especially when operational resource constraints are less critical. As will be discussed in more detail below, the neural networks in many embodiments can be generated as one or more models that can be converted into embedded code which may be executed to generate various inferences within the storage device. An overview of this process is described in more detail in FIG. 4.

Figure 4:
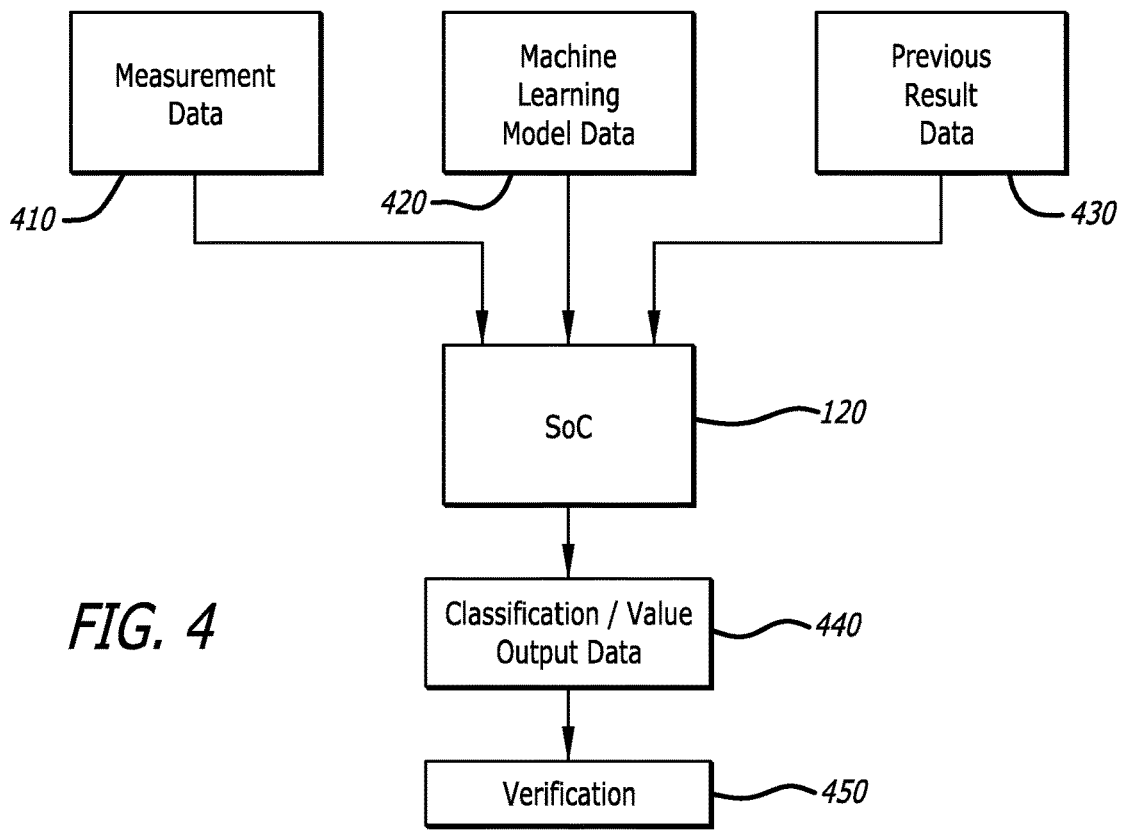
FIG. 4 is a high-level conceptual flowchart depicting the utilization of machine learning within a storage device in accordance with an embodiment of the disclosure.

Referring to FIG. 4, a high-level conceptual flowchart 400 depicting the utilization of machine learning within a storage device in accordance with an embodiment of the disclosure is shown. Broadly, the process of utilizing machine learning within existing storage devices can be described by the SoC 120 receiving a plurality of inputs such as, but not limited to, measurement data 410, machine learning model data 420, and previous results data 430. These input data 410, 420, 430 can be utilized by the SoC 120 to generate a plurality of classification and/or value output data 440.

As discussed above, the classification and/or value output data 440 can be understood as an inference relating to a particular measurement, generalization, or other aspect of the storage device. By way of example and not limitation, the SoC 120 may run software that is organized and compiled based on the received data 410, 420, 430 in response to receiving or generating a request for a particular drive-related measurement. In certain embodiments, the computational resources and/or time needed to generate, compile, and process machine learning models to respond with an estimated value or inference can be less than the computational resources and/or time needed to perform the actual measurement. In these instances, the ability to generate machine learning-based inferences is a more efficient response for the storage device.

In a number of embodiments, the classification and/or value output data 440 can be verified through one or more verification processes 450. Verification 450 can occur for each generated inference or during an initial set up or weighting process when a new machine learning model is being utilized. In certain embodiments, the verification 450 can access one or more preconfigured thresholds associated with a range of values that may be expected from the machine learning-based classification and/or value output data 440. When the generated inference exceeds a preconfigured threshold, the verification 450 can prevent the use of the inference and request that a non-machine learning method be used to make the requested measurement and/or data generation. Verification 450 is described in more detail in the discussion of FIG. 9.

Figure 5:
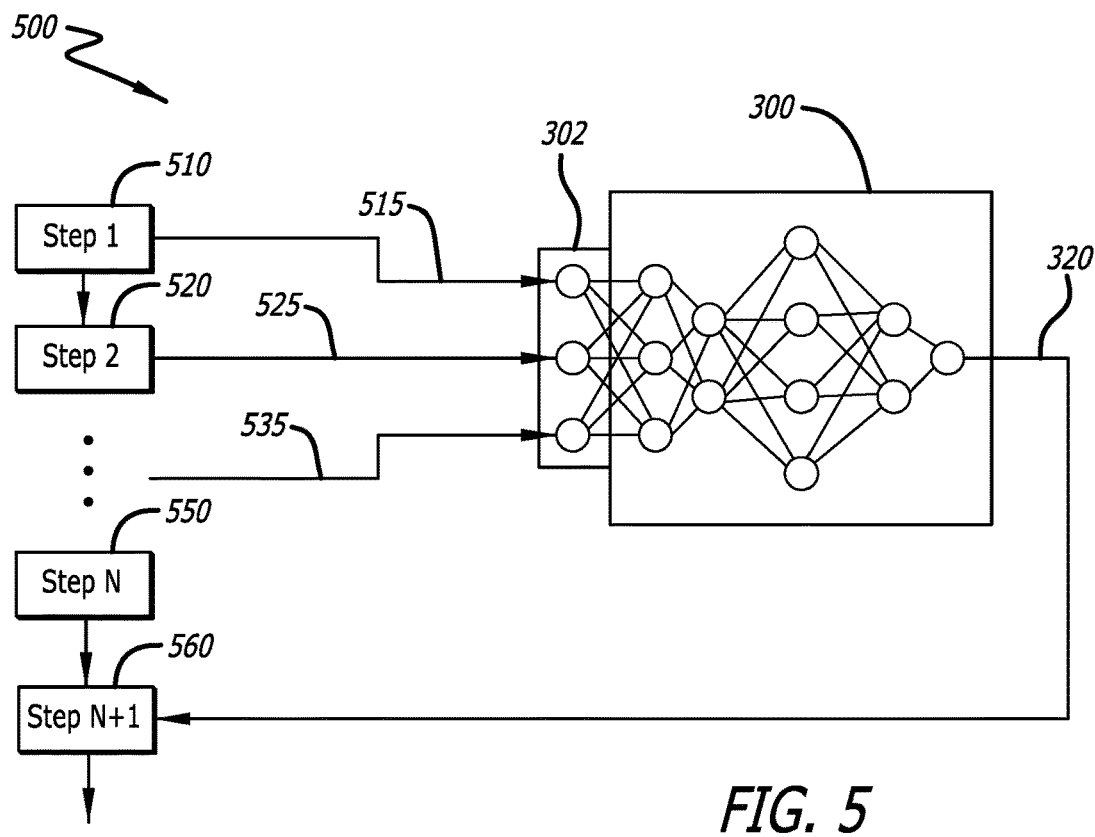
FIG. 5 is a conceptual flowchart depicting a process for replacing a plurality of steps of a process within a storage device with machine learning processing in accordance with embodiments of the disclosure.

Referring to FIG. 5, a conceptual flowchart depicting a process 500 for replacing a plurality of steps of a process within a storage device with machine learning processing in accordance with embodiments of the disclosure is shown. Software operating on the SoC can attempt to complete a wide variety of processes which may include one or more steps. Therefore, it is contemplated in many embodiments that during normal operations of various process 500, that one or more steps may be replaced by machine learning-based equivalents.

As conceptually shown in the embodiment of FIG. 5, the process 500 begins with a first step 510 which proceeds to a second step 520 onward until a final step N+1 560. Steps 1-N 510-550 are configured to retrieve and/or generate an output value that can be returned by the final step N+1 560 as output. In lieu of executing particular steps within the process 500, a neural network (i.e. machine learning model) 300 may be utilized to generate inference output data 320 that can be used by the final step N+1 560 to provide an output/response. In this way, a plurality of intermediate steps 510, 520 can be skipped and/or utilized as input signals 515, 525, 535 for the input layer 302 of the neural network 300. Various embodiments can then utilize the inference output data 320 as input into the Step N+1 560 instead of executing step N 550. Thus, for embodiments where execution of step N 550 is more computationally intensive than generating inference output data 320 from a machine learning model or neural network 300, the process 500 allows the storage device to operate more efficiently.

As those skilled in the art will appreciate, the specific structure and number of steps within a process can vary depending on the complexity of the process. Additionally, the number of steps utilized as input for the machine learning model can vary based on the intricacy of the inference to be generated. It is also contemplated that the representation of the process 500 depicted in FIG. 5 is conceptual in nature and can be processed and configured to be represented as embedded source code that is executed by one or more processors within the storage device, such as an SoC.

Figure 6:
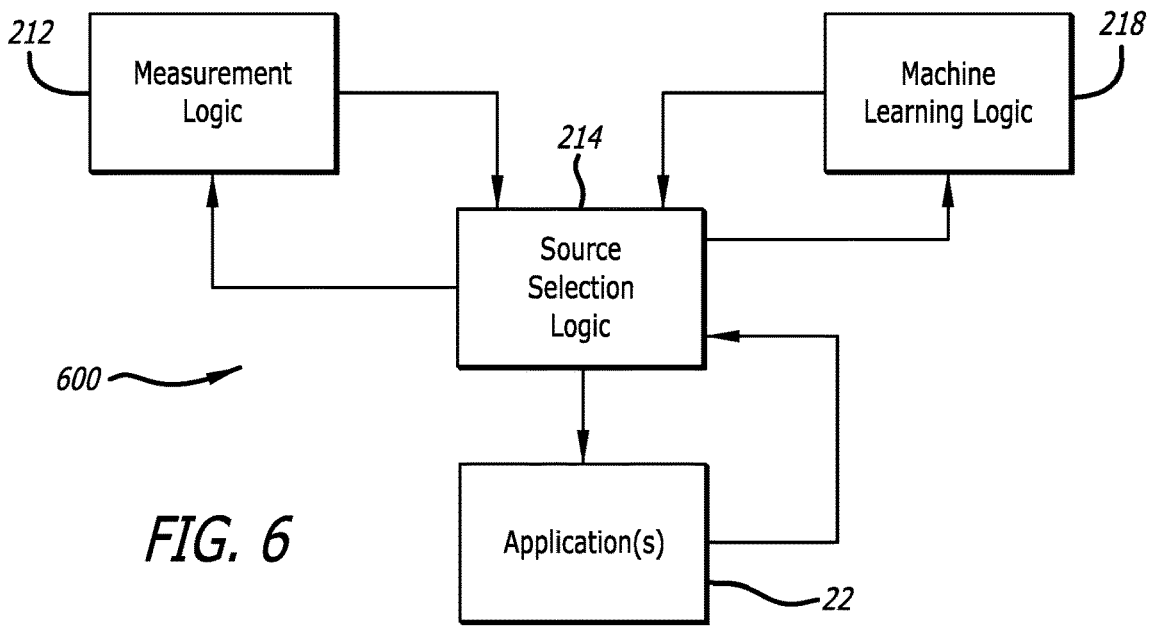
FIG. 6 is a conceptual flowchart depicting a process for selecting machine learning processing in response to a measurement request in accordance with embodiments of the disclosure.

Referring to FIG. 6, a conceptual flowchart depicting a process 600 for selecting machine learning processing in response to a measurement request in accordance with embodiments of the disclosure is shown. As discussed above, one or more applications 22 may be processed within a SoC of a storage device. As part of the execution process, the application(s) 22 may require one or more measurements to occur within the storage device. Particular measurements may be computationally intensive, require an excessive amount of time to process, and/or require more resources that may currently be available.

During normal operation, application(s) 22 can send a request for a measurement. In many embodiments, the storage device can be configured with a source selection logic 214 that can intercept or otherwise read the measurement request data and/or signal. In response to known measurements requests, the source selection logic 214 can direct the storage device to select between taking a traditional measurement (via a measurement logic 212) or generating a machine learning-based inference to simulate a traditional measurement (via a machine learning logic 218).

When the source selection logic 214 determines that generating a machine learning-based inference, an activation signal can be transmitted to the machine learning logic 218. As discussed in more detail above, in response to receiving the activation signal, the machine learning logic 218 can determine a specific machine learning model that can be utilized, generate a contract associated with that model, process the model with the contract and generate an inference that can be passed back to the application(s) 22. In a number of embodiments, the inference generated by the machine learning logic 218 can be verified for corresponding to a certain range before being returned to the application(s) 22. In response to the generated inference being outside of an acceptable range or otherwise failing a verification process, the source selection logic 214 can send the initial measurement request to the measurement logic 212 to initiate a traditional measurement.

Although the embodiment depicted in FIG. 6 is shown with the inference and measurement responses sent through the source selection logic 214 before being routed back to the application(s) 22, it is contemplated that measurements and/or inferences can be directly routed to the application(s) 22 or to any other logic within the storage device as needed. In further embodiments, other types of data may be requested by the application(s) 22 besides measurements. Although the embodiment described within FIG. 6 describes processes for selecting between various measurement requests, any external data that may be requested by application(s) 22 can be evaluated by the source selection logic 214 for potential inference generation by the machine learning logic 218.

Figure 7:
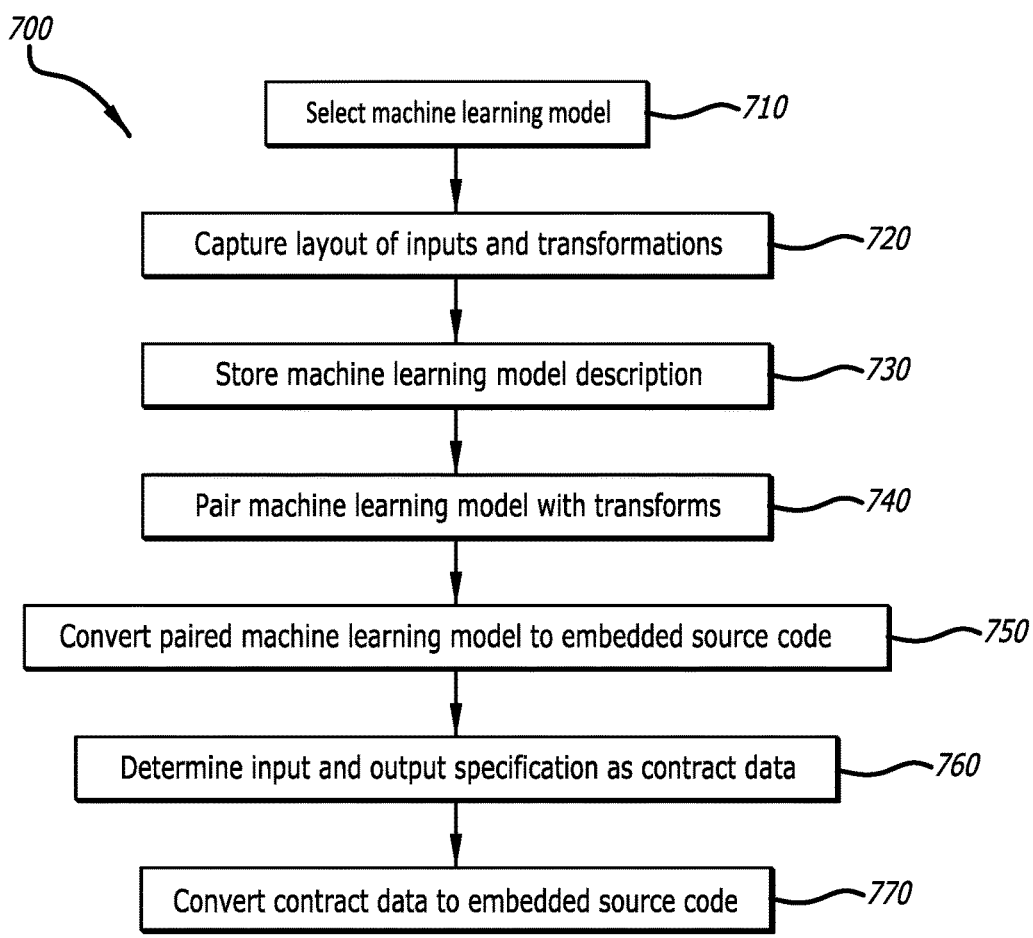
FIG. 7 is a conceptual flowchart depicting a process for generating embedded source code for machine learning processing in accordance with embodiments of the disclosure.

Referring to FIG. 7, a conceptual flowchart depicting a process 700 for generating embedded source code for machine learning processing in accordance with embodiments of the disclosure is shown. In many embodiments, the utilization of various machine learning models to generate an inference is accomplished by selecting a specific model and converting it (and an associated contract) to embedded machine readable code that can be executed within the SoC of the storage device. The process 700 typically initializes when a machine learning model is selected for use (block 710).

A selected machine learning model may comprise a plurality of inputs and transformations that can be arranged in a particular layout. Typically, the machine learning model is trained from historical data which can include previously generated inferences or other measurements and/or data. In additional embodiments, the training of the model can be configured during the manufacturing process for continual retraining of the model during use. In further embodiments, the weights of a model may be set prior to the manufacturing process and remain static. In alternative embodiments, model weights may be configured shortly after manufacture of the storage device and correspond to device-specific characteristics of each individual storage device.

The process 700 can be configured to capture this layout of inputs and associated transformations (block 720). This capture can be further stored as a machine learning model description (block 730). In a number of embodiments, the machine learning model description can be a computational graph of the model. However, it is contemplated that any compatible representation of the machine learning model may be utilized prior to conversion of embedded source code. The process 700 may also pair machine learning models with the associated transforms (block 740). Transforms can be processed separately from the machine learning models in various embodiments as multiple models may utilize the same transforms. Thus, by utilizing associations between the machine learning models and transforms, required storage space can be reduced, and transforms and/or models can be updated independently as needed in response to more efficient or accurate models and/or transforms.

Upon pairing, a machine learning model and transforms can be converted to embedded source code that can be executed within the SoC of the storage device at runtime (block 750). In various embodiments, the conversion will generate at least one C++ and header file format pair. However, it is contemplated that any machine-readable format may be generated during the conversion process.

Each machine learning model will have at least a plurality of inputs and outputs. The number, types, and configurations of the inputs and outputs can vary based on the type of processing done and inference generated by the machine learning model. Therefore, the storage device typically requires a configuration in order to properly deliver the necessary input data to generate an inference within the model. Likewise, the size, type, and format of the generated inference output should be stored within a configuration in order to facilitate proper delivery and processing of the output.

This configuration of input and output formats can be understood as a "contract." The contract can be a file or other data structure that can indicate which data should be captured, read, or otherwise acquired as input within the storage device and fed into the input of the machine learning model as well as the specification of the output of the model that can be utilized as an inference within the storage device. The process 700 can examine the machine learning model to be utilized and determine the input and output specification as contract data (block 760). In response to receiving contract data, a conversion can occur to generate additional embedded source code associated with the contact data (block 770). Once the embedded source code has been generated, a storage device can utilize the source code to generate an utilize output data from the machine learning model, generally as an inference. This process is described in more detail below.

Figure 8:
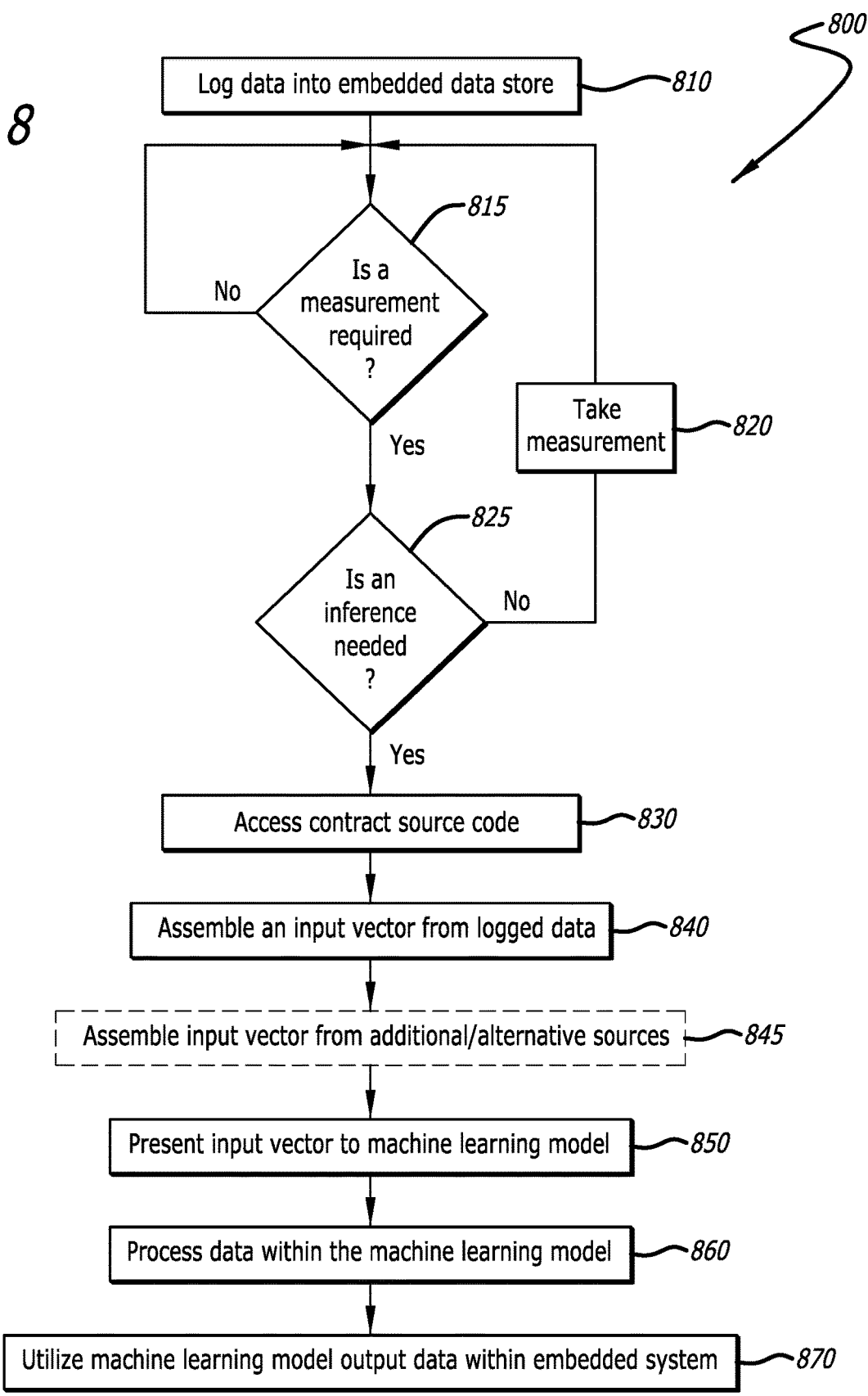
FIG. 8 is a conceptual flowchart depicting a process for utilizing machine learning processing within an embedded system in accordance with embodiments of the disclosure.

Referring to FIG. 8, a conceptual flowchart depicting a process 800 for utilizing machine learning processing within an embedded system in accordance with embodiments of the disclosure is shown. Prior to the utilization of machine learning generated inferences, many embodiments of the storage device log a plurality of data within an embedded data store, such as the log(s) 38 of FIG. 1 (block 810). As discussed above, the logged data can include any data generated within the storage device that may be recalled for later use within a machine learning model.

During the subsequent operation of the storage device, a measurement or other data set may be requested by an application or other software (block 815). Once the measurement is requested, a decision can be made to determine if a machine-learning based inference is preferred over a traditional measurement (block 825). This determination can be made in a number of ways, including the use of a source selection logic such as the source selection logic 214 as described in FIG. 6. When it is determined that no inference is needed, the process 800 can indicate that a direct measurement should be taken (block 820).

When it is determined that a machine learning based inference is needed, the contract source code can be accessed (block 830). Once accessed, the process 800 can assemble an input vector from the logged data (block 840). An input vector can be described as a description of the various types, locations, and sizes of data to be obtained from a log that is needed to generate an input to a machine learning model. A completed input vector can be understood as a plurality of data that has been assembled and is formatted to directly interface with the input of a machine learning model. Each machine learning model may require a unique input vector. In many embodiments, the input vector can be generated from contract data. It is contemplated that certain embodiments may assemble an input vector from data available outside of the internal logs (block 845). In these embodiments, the process 800 may access other data within the storage device memory or may attempt to acquire data external to the storage device.

Once assembled, the input vector can be presented to the machine learning model for processing (block 850). Presentation of the input vector can occur in a number of ways including, but not limited to, passing in the input vector as a variable of a function call. The presented input vector can then be processed within the machine learning model (block 860). The processing of the data will generate output data, typically in the form of an inference. The storage device can then utilize the machine learning model output data within the system (block 870). However, in many embodiments, the output data can be processed through a verification step prior to utilization within the storage device. Discussion of this process is outlined in more detail below.

Figure 9:
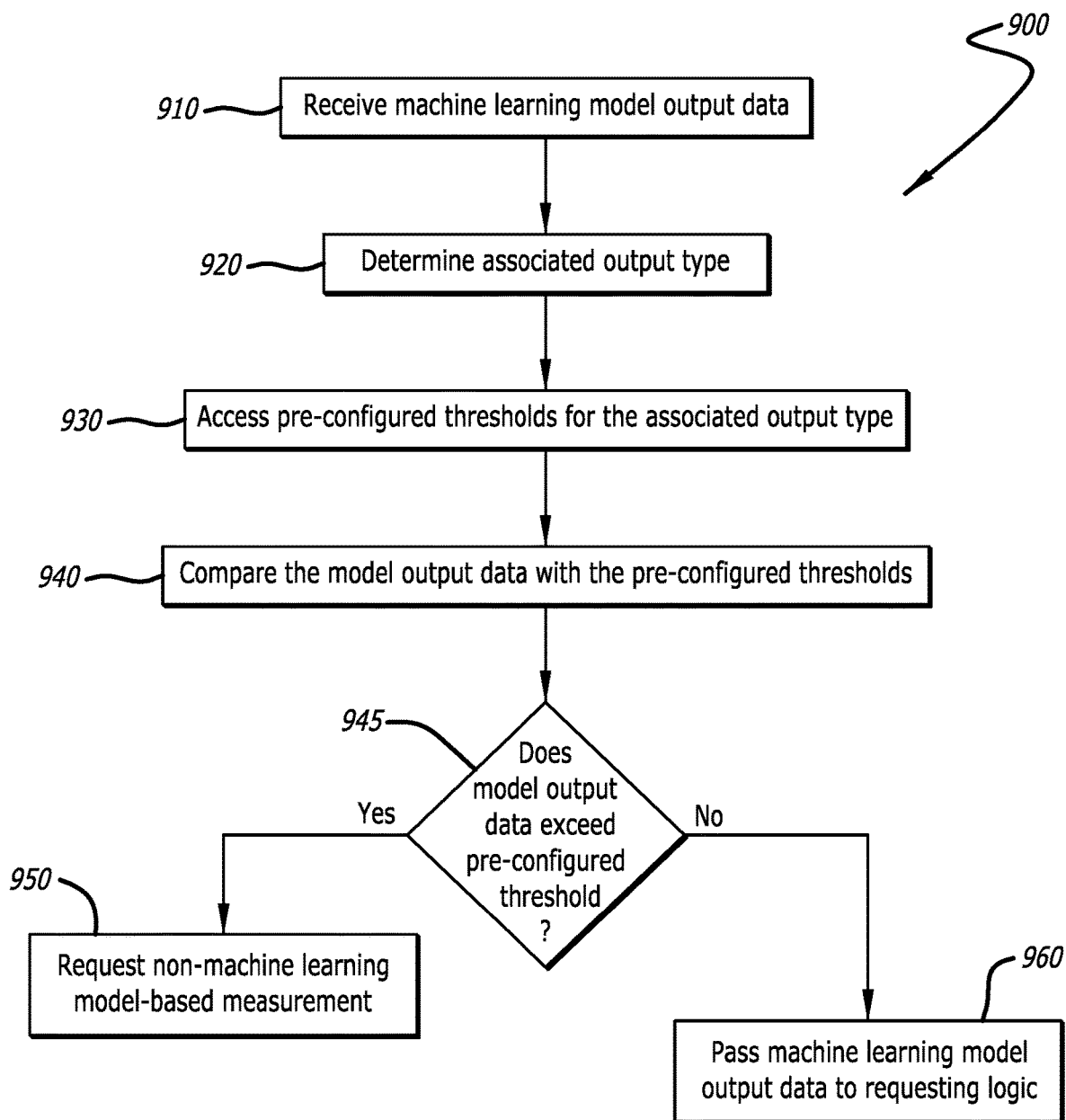
FIG. 9 is a conceptual flowchart depicting a process for verifying machine learning output data in accordance with embodiments of the disclosure.

Referring to FIG. 9, a conceptual flowchart depicting a process 900 for verifying machine learning output data in accordance with an embodiment of the disclosure is shown. As discussed previously within FIG. 4, various embodiments may attempt to verify the output data generated by the machine learning models. This may be done to ensure the accuracy and applicability of the output data.

A process 900 for verifying model output data can initially receive machine learning model output data for evaluation (block 910). As discussed above, the format and type of data that may be generated from machine learning models can vary greatly and can be modified based on the desired application. Thus, the process 900 will attempt to determine the associated output type of the generated inference (block 920).

By way of example and not limitation, the output type of a generated inference may be a truth value between 0 and 1, and in other embodiments may be configured as a plurality of configuration values associated with each head of a hard-disk based memory. Each type of output data structure and value can yield unique boundaries for what is classified as a valid output and a non-valid output. Thus, the process 900 may access one or more pre-configured thresholds for the associated output type of the machine learning model (block 930).

When the process 900 has obtained suitable threshold values for the received output data, a comparison can occur between the model output data and the pre-configured thresholds (block 940). Upon comparison, a determination can be made to evaluate if the model output data exceeds one or more of the pre-configured thresholds (block 945). Pre-configured thresholds may include, but are not limited to, error margins, median/mean values, standard deviation values, minimum and/or maximum values. In certain embodiments, the generated model output data (i.e. inference) may be associated with a plurality of constraints, dimensions, or other factors. In these embodiments, determination of exceeding thresholds may include determining if a particular number or range of values within the pre-configured thresholds have been exceeded. In some embodiments, the examination of output data may be looking for a change in data value between measurements. Finally, in additional embodiments, pre-configured thresholds may be combined between various types of output data to generate a determination.

If no thresholds have been exceeded, the process 900 may then pass the machine learning model output data to the logic or other software that originated the request (block 960). In the event that one or more of the pre-configured thresholds have been exceeded, the process 900 can subsequently issue a request for a traditional, non-machine learning model-based measurement to occur (block 950). In various embodiments, the process 900 can direct the request to the non-machine learning-based method such that any output is directly passed to the requesting logic and/or software.

Figure 10A:
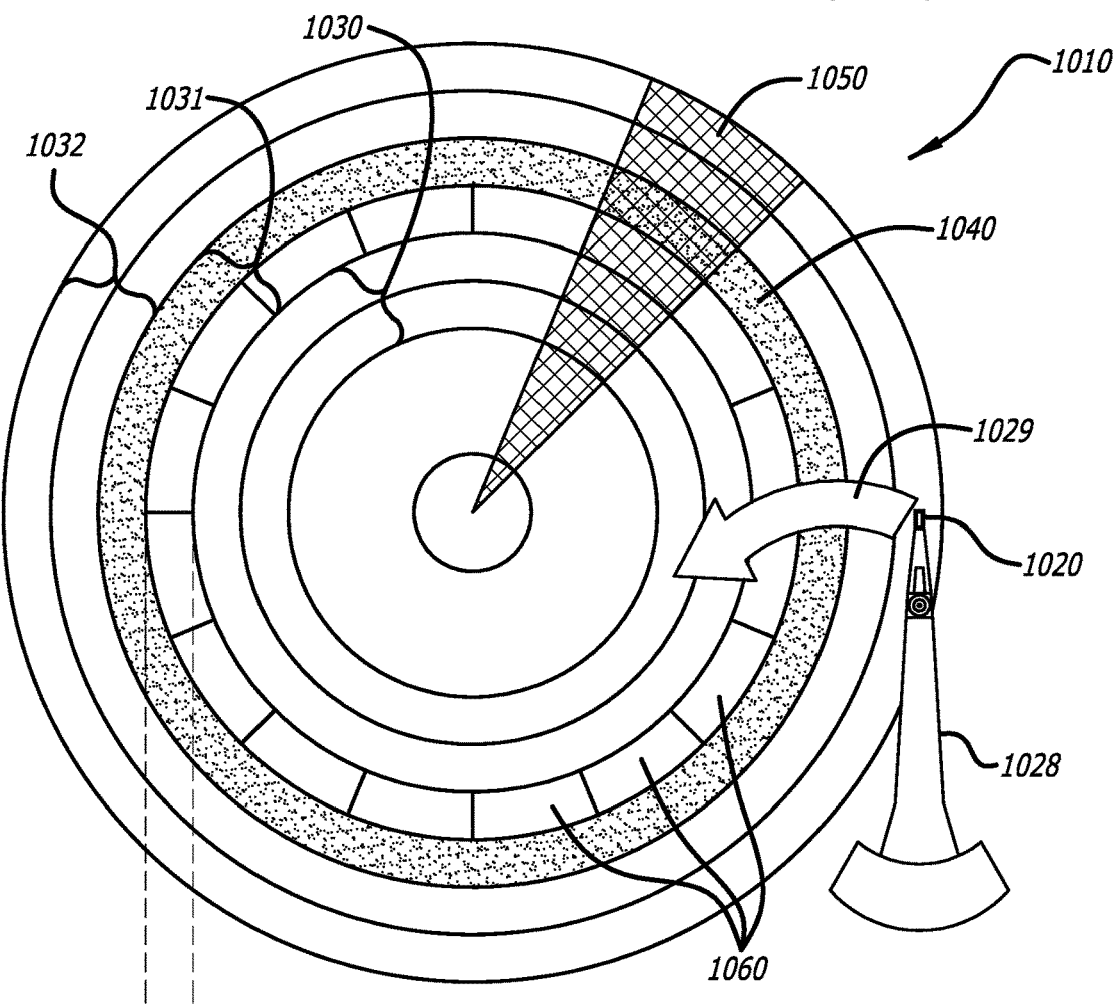
FIG. 10A is a conceptual top down view of an HDD platter and head system in accordance with embodiments of the disclosure.
Figure 10B:
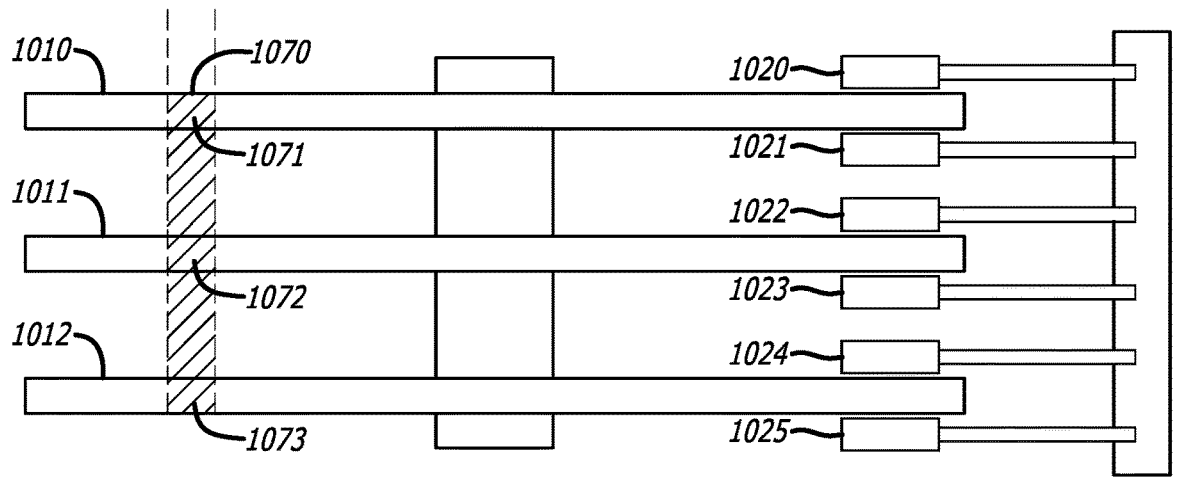
FIG. 10B is a conceptual side view of an HDD multi-platter and head system in accordance with embodiments of the disclosure.

Referring to FIG. 10A, a conceptual top down view of an HDD platter 1010 and head 1020 system in accordance with embodiments of the disclosure is shown. As will be understood by those skilled in the art, many storage devices utilize HDD platter-based structures to store data. The platter 1010 can comprise a variety of tracks 1040 that are read by a head 1020 attached to a moveable arm 1028. Data is most often stored in circular paths along varying circumferences of the platter 1010. These paths are called tracks 1040.

A track 1040 may be read by the head 1020 via a displacement 1029 of the arm 1028 toward the track 1040 from a resting position. While the tracks depicted in FIG. 10A are represented as idealized perfect circles, those skill in the art will recognize that actual HDD tracks may wobble or otherwise deviate from the idealized track circle due to various factors including physical platter shifting, or other geometry irregularity. To compensate for the irregularities within a track that may require movement of the head 1020 to compensate, a variety of embodiments generate position error signal data which relates to the amount of drift per track at any given location on the platter 1010.

Each track within the platter may be grouped together as one or more zones 1030-1032. For example, the embodiment depicted in FIG. 10A is comprised of three zones, with the inner two tracks comprising a first zone 1030, the middle two tracks, including track 1040, comprises a second zone 1031, and the outer two tracks comprising a third zone 1032. Zones may be grouped based on their physical distance from the center of the platter 1010. In this way, different zones may utilize different data storage densities (e.g., Bits per Inch ("BPI")) to more efficiently store data on tracks of varying sizes. Due to effects such as reading/writing frequency limits and narrowing tracks due to tangential head read spaces, the storage densities of each zone can vary, even between different, but similarly configured devices. This can be due to the small physical differences created within each storage device during the manufacturing process.

Each track 1040 can be comprised of a plurality of sectors 1060. Typically, HDDs are figuratively divided into a plurality of small arcs, like a piece of pie. The plurality of sectors 1050 along an HDD can be seen to vary in size based on their distance from the center of the platter 1010. However, sectors 1060 along the same track are typically divided in equal units of data storage size. In some embodiments, the number of sectors 1060 available per track may be limited within the Basic Input/Output System ("BIOS") of the storage device. Attribute data that may be associated with HDD sectors may include the overall sector size, whether the sector is corrupted, whether data is stored Referring to FIG. 10B, a conceptual side view of an HDD multi-platter and head system in accordance with embodiments of the disclosure is shown. A typical HDD will be comprised of one or more platters 1010-1012 which are paired with one or more heads 1020-1025. The number of heads is relative to the total number of sides of all of the platters 1010-1012 used to store data. In some embodiments, the HDD may reserve one or two heads for maintaining the accuracy of the arm position. In further embodiments, HDDs may utilize technologies that allow for multiple heads to be utilized per platter side.

As discussed above, most embodiments of HDDs store data in circular paths on the surface of each platter side called tracks. The plurality of tracks of similar circumference within the series of platters 1010-1012 can be called a cylinder 1070. Therefore, within the plurality of HDD platters 1010-1012, a plurality of different sized cylinders may exist. The cylinder 1070 depicted in FIG. 10B comprises a specific track (shown as a cross-section) of the platters 1010-1012. The cylinder 1070 specifically comprises a first track 1071 on the first platter 1010, a second track 1072 on the second platter 1011, and a third track 1073 on the third platter 1012. Those skilled in the art will recognize that an HDD may comprise any number of platters of various sizes and read heads based upon the application desired and physical limitations available. In further embodiments, the cylinder 1070 may be configured as a landing zone which is an unused cylinder utilized as a parking space for the heads 1020-1025. It is noted that while an HDD is shown as an example in these figures, in various embodiments the data processing approach can be applied to other storage devices. For example, in solid state drives (SSDs), measurements or attributes discussed above may be related to solid state memory health and status, at various physical or logical sub-divisions such as dies, planes, blocks, pages, etc. Examples of solid state memory may include, NAND flash memory, NOR flash memory, Magnetoresistive Random Access Memory (MRAM), Phase Change Memory (PCM), Resistive Random Access Memory (ReRAM), and the like. Likewise, in tape drives, measurements or attributes discussed above may be related to tracks and sectors on a magnetic tape media.

Figure 11:
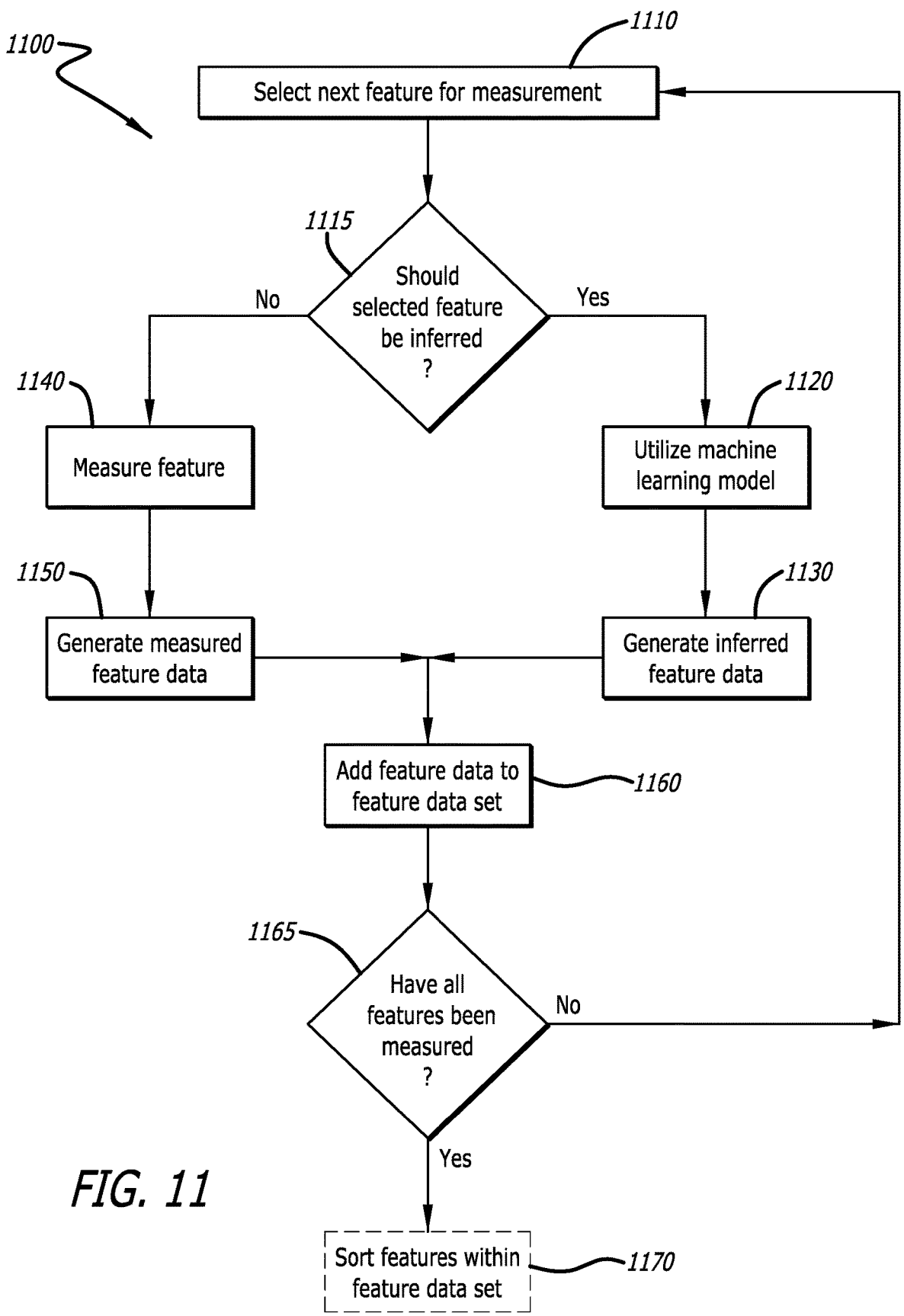
FIG. 11 is a conceptual flowchart depicting a process for generating a feature data set in accordance with an embodiment of the disclosure.

Referring to FIG. 11, a conceptual flowchart depicting a process 1100 for generating a feature data set in accordance with an embodiment of the disclosure is shown. When operating a storage device, there may be operations that will require the processing of multiple types of attributes of data. Specifically, a plurality of features may need to be measured and processed to generate an output or other calculation necessary for further operation. A calibration process for instance may require the measurement of all features associated with the specific attribute under calibration. This may require a large number of measurements that are time or computationally expensive.

For example, a determination about an average feature of a sector within an HDD may require the actual reading of every sector on each platter. This requirement of measuring each sector may lead to inefficient storage device usage and/or the inability to deliver an accurate result within the desired time window. Therefore, embodiments of the disclosure can utilize one or more machine learning models that can provide inference data in lieu of conducting an actual measurement. As described in more detail above, the machine learning model may be provided an input vector that utilizes various types of data including historical data such that a previously measured value for that feature (e.g. sector) may approximate the current value depending on the required accuracy of the output.

Thus, the process 1100 depicted in FIG. 11 can begin by selecting the next (or first) feature for measurement (block 1110). The feature may be related to a physical aspect of the storage device (e.g., heads, sectors, tracks, etc.) or to any external data that may be presented or available for processing. Next, a determination about whether the selected feature should be inferred or measured can occur (block 1115). As discussed in more detail above, the decision to conduct an actual measurement or utilize one or more machine learning models can be based on a variety of factors including, but not limited to, the degree of accuracy desired, the available time or computational resources, and/or type of related data available (historical, physically associated, etc.).

When the process 1100 determines that an inference should be made, one or more machine learning models can be utilized by generating and providing an input vector for processing (block 1120). The resulting output will be the generation of inferred feature data (block 1130). The inferred feature data may then be added to the feature data set that has been previously generated (block 1160). Conversely, when the process 1100 determines that the taken instead of an inference generated, the feature can be measured (block 1140). Once measured, feature data will be generated that correlates to that specific feature (block 1150). And like the generated inferred feature data, generated measured feature data can be added to the feature data set (block 1160). Therefore, it is contemplated that a feature data set may comprise multiple data types including measured and inferred feature data.

After adding data to the feature data set, the process 1100 can evaluate if all features have been measured (block 1165). For example, when all track features are to be tracked for processing, each track within the HDD should be evaluated. When more features are left to be analyzed, the process can then return and select the next feature for measurement (block 1110). When all features have been measured, the process 1100 may optionally sort the evaluated features within the feature data set (block 1170). This sorting process may allow for the evaluation of particular well- or poor-running components within the storage device for example. Sorting can be utilized when each feature is to be evaluated against other features instead of generating a value that is associated with an. average across the evaluated features.

Although the flowchart shown in FIG. 11 depicts only features, it is contemplated that this process 1100 may apply to any number of other attributes. Indeed, features of different scopes may be utilized as needed. As discussed below, a measurement or decision about attribute data of a first scope may be desired, but then may be missing supplemental data required to finish the measurement. However, data related to a second scope may can sometimes be utilized to generate inferences related to the first scope data (e.g., all sectors may be evaluated to generate data relating to the track they comprise). It is further contemplated that attribute data being evaluated in this manner can be formatted into parameterized data, such that the data may be formatted for use within a parametric or other optimization search.

Figure 12:
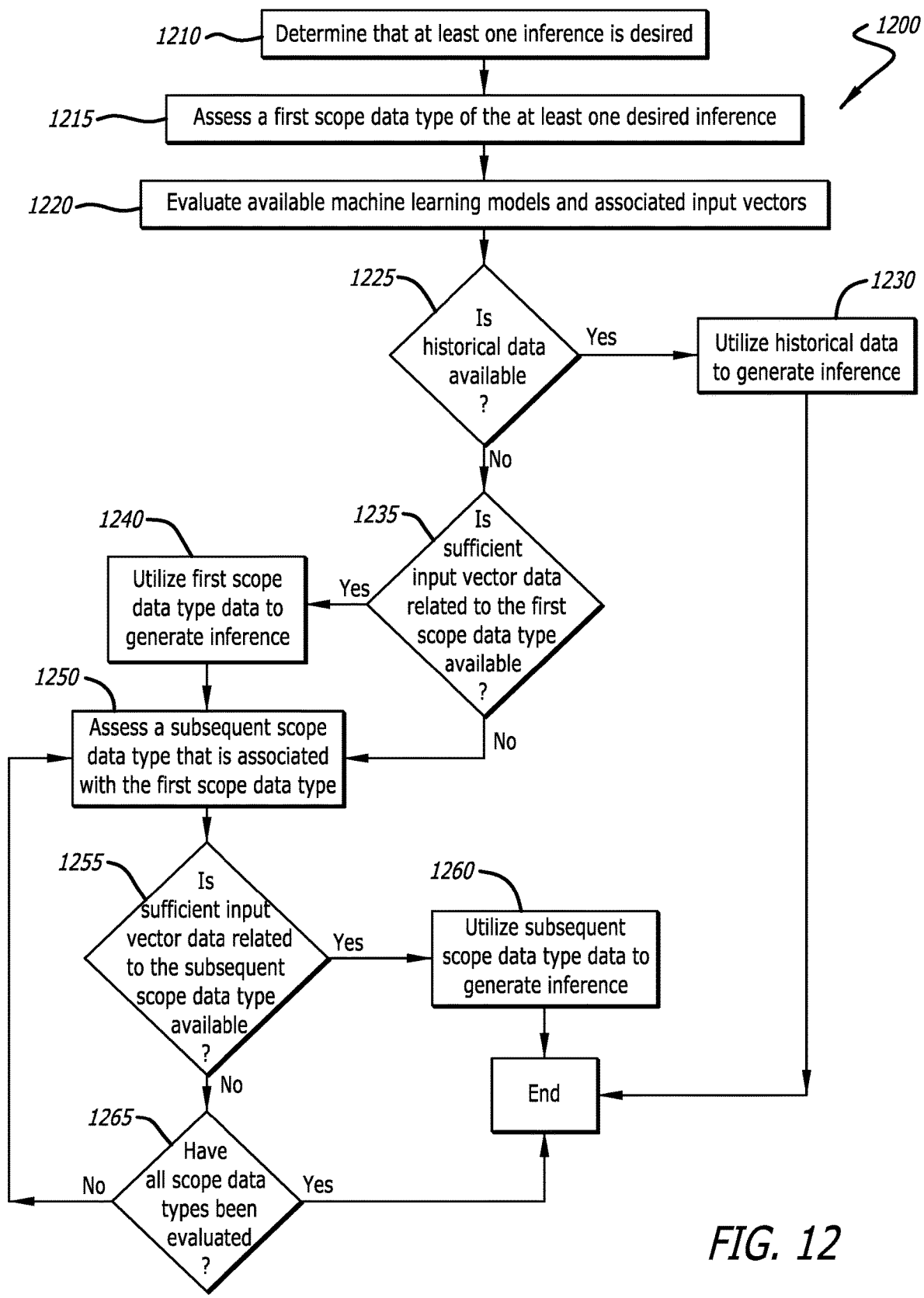
FIG. 12 is a conceptual flowchart depicting a process for utilizing data of varying scopes within machine learning models in accordance with an embodiment of the disclosure.

Referring to FIG. 12, a conceptual flowchart depicting a process 1200 for utilizing data of varying scopes within machine learning models in accordance with an embodiment of the disclosure is shown. As shown above in FIG. 11, one or more measurements or steps may be replaced by a generated inference model. The process 1100 can begin when at least one attribute is selected to have an inference generated (block 1210). A first scope of data may be accessed that is associated with the desired inference (block 1215). Based on the assessed first scope data type, the process 1200 can evaluate available machine learning models and associated input vectors (block 1220). The assessment may attempt to select a machine learning model that has an associated input vector that requires the same first scope data type that is being assessed.

Prior to generating an assessment, embodiments of the process 1200 may attempt to first determine if any historical data is currently available (block 1225). For example, in a number of embodiments, when recent historical (i.e., previously measured) data is available, there may not be a direct need to generate an inference and the historical data may simply be utilized in place of the desired measurement. Thus, in these embodiments, the historical data is utilized, and the process is terminated (block 1230). However, based on the specific input vector and desired application, the available historical data may simply be utilized as data within the input vector of the one or more machine learning models.

When insufficient historical data is available, the process 1200 can subsequently determine if sufficient input vector data related to the first scope data type is available (block 1235). For example, an input vector may require a particular number of inputs related to a first scope date type such as tracks within an HDD. When available, the process 1200 can utilize the first scope data type data to generate an inference (block 1240). In certain embodiments, the input vector may only require a single scope of data which may be satisfied at this step and thus ending the process. However, in a number of embodiments, input vectors may require multiple levels of scope or otherwise different attributes to properly generate the input vector.

As depicted in the embodiment of FIG. 12, the process 1200 subsequently assess additional scope data types that are associated with the first scope data type (block 1250). This step can also occur as a result of an insufficient finding of input vector data related to the first scope data type being available (block 1235). For example, an input vector may request particular track data that is currently unavailable but may be generated or otherwise approximated from processing the associated sectors that make up the track. The track would be considered a first data scope type while the sectors would be the second scope data type.

When assessing the second or subsequent scope data types, the process 1200 can further determine if the newly assessed scope data type sufficient for generating an input vector to process an inference related to the original, first scope data type (block 1255). If there is still insufficient data available to generate a proper input vector, the process 1200 can determine if any further scope types are available for evaluation (block 1265). If there are additional scope data types that have not yet been evaluated, then the process 1200 can return and assess a subsequent scope data type from the remaining scope data types (block 1250). If there are no more scope data types to evaluate, then the process 1200 can end and a message or other signal transmitted that an actual measurement should occur due to insufficient data being available to generate an inference. In further embodiments however, the process 1200 may simply attempt to select a new machine learning model with a different set of scope data types associated with the input vector and repeat the process 1200 from the beginning with the newly selected machine learning model and input vector.

If there is sufficient input vector data related to the subsequent scope data type, the process 1200 can utilize that scope data to generate an inference (block 1260). As described in more detail above, the input vector can be comprised of any number of scope data types and when particular attributes or instances of the scope data type is not available, additional scopes of data may be evaluated and utilized in place of the first scope data type. For example, an inference that requires measurements on a zone may require data associated with each track within that zone. However, if a particular track doesn't have available data within the logs of the storage device, the missing input data may be generated by analyzing the properties of the neighboring tracks (physically similar attribute) or by analyzing the sectors that make up that track (different scope of attribute).

It is contemplated that numerous techniques to approximate data through machine learning processes in lieu of performing an actual measurement may be accomplished. As described above, the only limits on generating such inferences are related to the available computations power and the time constraints of receiving the desired results. For example, many data approximations of a first feature can be made by utilizing additional features that are physically associated with the desired first feature. For example, when evaluating attribute data related to a physical property of an HDD (head, platter, zone, track, sector, etc.), there are typically multiple similar attributes that have similar data, actions, or physical proximity. In a number of embodiments, one or more machine learning models may attempt to physically emulate the storage device being evaluated. For example, an HDD machine learning model may be configured with one or more nodes associated with each sector, the sector nodes being connected as a track layer (or sub-network), etc. In further embodiments, processing can be done on an image or video data file that may have compression or pixel data that is similar between one or more frames wherein proximity data may be utilized to in place of missing data.

Applications of the use of multiple attribute types of data within machine learning-based inference generation can further include supplementing the process of format selection within HDDs, storage device calibration tasks, manufacturing back-end process for HDDs (detection, mapping, etc.), and general field usage. When utilized in the field, further machine learning-based models may be deployed to detect workload patterns, optimize error recoveries, administering cache policies, optimizing rotational positions, operating command queues, and/or optimizing maintenance policies. Finally, during both the manufacturing and field usage cases, machine learning-based models can be configured to help analyze failures, predict potential failures, monitor present and past health, and manage health policies and rules.

Information as herein shown and described in detail is fully capable of attaining the above-described object of the present disclosure, the presently preferred embodiment of the present disclosure, and is, thus, representative of the subject matter that is broadly contemplated by the present disclosure. The scope of the present disclosure fully encompasses other embodiments that might become obvious to those skilled in the art, and is to be limited, accordingly, by nothing other than the appended claims. Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, work-piece, and fabrication material detail can be made, without departing from the spirit and scope of the present disclosure, as set forth in the appended claims, as might be apparent to those of ordinary skill in the art, are also encompassed by the present disclosure.

What is claimed is:

1. A storage device, comprising:
a Non-Volatile Memory (NVM) for storing data; and
one or more processors communicatively coupled to the NVM, the one or more processors being configured, individually or in combination, to direct the storage device to:
execute a plurality of applications within the NVM;
receive a request for data of a first attribute type of a first scope from at least one application of the plurality of applications, the first attribute type being associated with a characteristic or operational status of the storage device;
determine whether the requested data is suitable for substitution by an inference, wherein the determination is based on one or more factors associated with the request for data;
in response to determining that the requested data is not suitable for substitution by an inference, indicate that a direct measurement should be taken; and
in response to determining that the requested data is suitable for substitution by an inference:
select at least one machine learning model from one or more available machine learning models for generating a suitable inference;
access a contract associated with the selected machine learning model;
assess whether at least one scope other than the first scope and corresponding to a different physical memory hierarchical level from the first scope is sufficient for generating an input vector corresponding to the selected at least one machine learning model;
generate an input vector corresponding to the selected at least one machine learning model, wherein the input vector comprises data associated with a second attribute type of a second scope at a different physical memory hierarchical level from the first scope, the second attribute type being associated with a characteristic or operational status of the storage device;
process the input vector into inference data via the at least one selected machine learning model; and
pass the processed inference data to the requesting at least one application.

2. The storage device of claim 1, wherein the first scope and the second scope are associated.

3. The storage device of claim 1, wherein the storage device is a Hard Disk Drive (HDD).

4. The storage device of claim 3, wherein at least one of the first or second attribute types comprises an attribute type related to at least one of: an HDD track, head, cylinder, sector, or platter.

5. The storage device of claim 3, wherein at least one of the first or second attribute types comprises an attribute type related to at least one of an SSD die, plane, block, or page.

6. The storage device of claim 1, wherein the storage device is a Solid State Drive (SSD).

7. The storage device of claim 1, wherein the one or more processors are further configured, individually or in combination, to determine whether available second attribute data of the second attribute type is sufficient to generate the input vector prior to generation.

8. The storage device of claim 7, wherein, in response to having insufficient data of the second attribute type available to completely generate the input vector, the one or more processors are further configured, individually or in combination, to utilize data associated with a third attribute type, the third attribute type being associated with a characteristic or operational status of the storage device.

9. The storage device of claim 8, wherein the one or more processors are further configured, individually or in combination, to utilize the data associated with the third attribute type for generation of the input vector.

10. The storage device of claim 8, wherein the one or more processors are further configured, individually or in combination, to utilize the data associated with the third attribute type to generate sufficient data of the second attribute type for generation of the input vector.

11. The storage device of claim 1, wherein the one or more processors are further configured, individually or in combination, to compare the processed inference data against one or more pre-configured thresholds.

12. The storage device of claim 11, wherein, in response to the processed inference data exceeding the one or more pre-configured thresholds, the one or more processors are further configured, individually or in combination, to generate a request for a non-machine learning model-based measurement of the requested data.

13. The storage device of claim 11, wherein the pre-configured thresholds are based upon historical measurements.

14. The storage device of claim 11, wherein the preconfigured thresholds are based upon past processed inference data associated with the same attribute type.

15. The storage device of claim 1, wherein at least one of the first or second attribute types are parameterized data.

16. The storage device of claim 1, wherein the one or more processors are further configured, individually or in combination, to direct the storage device to further in response to determining that the requested data is suitable for substitution by an inference:
- identify one or more troublesome components of the storage device based, at least in part, on a sorted set of the requested data of the first attribute type of the first scope.

17. A method for generating machine-learning based inferences within a storage device, comprising:
- receiving a request for data of a first attribute type of a first scope from one application of a plurality of applications executed within a Non-Volatile Memory, wherein the requested data is a measurement associated with the storage device;
- determining whether the requested data is suitable for substitution by an inference, wherein the determination is based on one or more factors associated with the request for data;
- in response to determining that the requested data is not suitable for substitution by an inference, indicating that a direct measurement should be taken; and
- in response to determining that the requested data is suitable for substitution by an inference:
  - selecting at least one machine learning model from one or more available machine learning models for generating a suitable inference, wherein a selected machine-learning model utilizes input data of a second attribute type of a second scope at a different second physical memory hierarchical level from the first scope;
  - accessing a contract associated with the selected machine learning model;
  - assessing whether the second scope and corresponding second physical memory hierarchical level is sufficient for generating a suitable inference for the requested data of the first attribute type of the first scope;
  - assembling an input vector based on the accessed contract and comprising data associated with the second attribute type;
  - providing the input vector to the selected machine learning model;
  - receiving an inference;
  - verifying the inference; and
  - passing the verified inference to the requesting application.

18. The method of claim 17, wherein the first and second attribute types are associated with differing scopes of the storage device.

19. The method of claim 17, wherein further in response to determining that the requested data is suitable for substitution by an inference:
- identifying one or more troublesome components of the storage device based at least in part on a sorted set of the requested data of the first attribute type of the first scope.

20. A method for replacing one or more steps of a process executed within a storage device, comprising:
- receiving a request from one or more applications executed within a Non-Volatile Memory for processing a plurality of steps associated with a first attribute type of a first scope;
- determining whether one or more of the requested plurality of steps are suitable for substitution by an inference generated from one or more available machine learning models, wherein the determination is based on one or more factors associated with the request;
- in response to determining that the requested plurality of steps is not suitable for substitution by an inference, indicating that a step should be taken; and
- in response to determining that one or more of the requested plurality of steps are suitable for substitution by an inference:
  - selecting a machine learning model from the one or more available machine learning models;
  - accessing a contract associated with the selected machine learning model;
  - assessing whether at least one scope other than the first scope and corresponding to a different physical memory hierarchical level from the first scope is sufficient for generating an input vector corresponding to the selected machine learning model;
  - generating an input vector corresponding to the selected machine learning model;
  - providing to the selected machine-learning model the input vector comprising at least a second attribute type of a second scope at a different physical memory hierarchical level from the first scope;
  - receiving an inference; and
  - passing the inference as an input to a subsequent step in the plurality of steps.

* * * * *